US011935281B2

(12) United States Patent
Senechal et al.

(10) Patent No.: US 11,935,281 B2
(45) Date of Patent: Mar. 19, 2024

(54) VEHICULAR IN-CABIN FACIAL TRACKING USING MACHINE LEARNING

(71) Applicant: Affectiva, Inc., Boston, MA (US)

(72) Inventors: Thibaud Senechal, Cambridge, MA (US); Rana el Kaliouby, Milton, MA (US); Panu James Turcot, Pacifica, CA (US); Mohamed Ezzeldin Abdelmonem Ahmed Mohamed, Cambridge, MA (US)

(73) Assignee: Affectiva, Inc., Boston, MA (US)

( * ) Notice: Subject to any disclaimer, the term of this patent is extended or adjusted under 35 U.S.C. 154(b) by 0 days.

(21) Appl. No.: 16/928,274

(22) Filed: Jul. 14, 2020

(65) Prior Publication Data

US 2021/0001862 A1    Jan. 7, 2021

Related U.S. Application Data

(63) Continuation-in-part of application No. 16/833,828, filed on Mar. 30, 2020, and a continuation-in-part of
(Continued)

(51) Int. Cl.
*G06V 10/82* (2022.01)
*B60W 40/08* (2012.01)
(Continued)

(52) U.S. Cl.
CPC ............. *G06V 10/82* (2022.01); *B60W 40/08* (2013.01); *G06N 20/00* (2019.01); *G06T 3/0006* (2013.01);
(Continued)

(58) Field of Classification Search
None
See application file for complete search history.

(56) References Cited

U.S. PATENT DOCUMENTS

| 3,034,500 A | 5/1962 | Backster, Jr. |
| 3,548,806 A | 12/1970 | Fisher |

(Continued)

FOREIGN PATENT DOCUMENTS

| JP | 08115367 | 7/1996 |
| KR | 10-2005-0021759 A | 3/2005 |

(Continued)

OTHER PUBLICATIONS

Rana Ayman El Kaliouby, Mind-reading machines: automated inference of complex mental states, Jul. 2005, University of Cambridge, Cambridge, United Kingdom.
(Continued)

*Primary Examiner* — Leon Viet Q Nguyen
(74) *Attorney, Agent, or Firm* — Adams Intellex, PLC

(57) ABSTRACT

Vehicular in-cabin facial tracking is performed using machine learning. In-cabin sensor data of a vehicle interior is collected. The in-cabin sensor data includes images of the vehicle interior. A set of seating locations for the vehicle interior is determined. The set is based on the images. The set of seating locations is scanned for performing facial detection for each of the seating locations using a facial detection model. A view of a detected face is manipulated. The manipulation is based on a geometry of the vehicle interior. Cognitive state data of the detected face is analyzed. The cognitive state data analysis is based on additional images of the detected face. The cognitive state data analysis uses the view that was manipulated. The cognitive state data analysis is promoted to a using application. The using application provides vehicle manipulation information to the vehicle. The manipulation information is for an autonomous vehicle.

31 Claims, 12 Drawing Sheets

Related U.S. Application Data application No. 16/781,334, filed on Feb. 4, 2020, which is a continuation-in-part of application No. 16/726,647, filed on Dec. 24, 2019, which is a continuation-in-part of application No. 16/146,194, filed on Sep. 28, 2018, now abandoned, said application No. 16/781,334 is a continuation-in-part of application No. 15/273,765, filed on Sep. 23, 2016, now abandoned, said application No. 16/146,194 is a continuation-in-part of application No. 15/061,385, filed on Mar. 4, 2016, now abandoned, which is a continuation-in-part of application No. 14/848,222, filed on Sep. 8, 2015, now Pat. No. 10,614,289, said application No. 15/273,765 is a continuation-in-part of application No. 14/796,419, filed on Jul. 10, 2015, now abandoned, which is a continuation-in-part of application No. 14/460,915, filed on Aug. 15, 2014, now abandoned, said application No. 14/848,222 is a continuation-in-part of application No. 14/460,915, filed on Aug. 15, 2014, now abandoned, said application No. 15/061,385 is a continuation-in-part of application No. 13/249,317, filed on Sep. 30, 2011, now abandoned, said application No. 14/460,915 is a continuation-in-part of application No. 13/153,745, filed on Jun. 6, 2011, now abandoned.

(60) Provisional application No. 62/955,493, filed on Dec. 31, 2019, provisional application No. 62/954,833, filed on Dec. 30, 2019, provisional application No. 62/954,819, filed on Dec. 30, 2019, provisional application No. 62/926,009, filed on Oct. 25, 2019, provisional application No. 62/925,990, filed on Oct. 25, 2019, provisional application No. 62/893,298, filed on Aug. 29, 2019, provisional application No. 62/827,088, filed on Mar. 31, 2019, provisional application No. 62/679,825, filed on Jun. 3, 2018, provisional application No. 62/637,567, filed on Mar. 2, 2018, provisional application No. 62/625,274, filed on Feb. 1, 2018, provisional application No. 62/611,780, filed on Dec. 29, 2017, provisional application No. 62/593,440, filed on Dec. 1, 2017, provisional application No. 62/593,449, filed on Dec. 1, 2017, provisional application No. 62/370,421, filed on Aug. 3, 2016, provisional application No. 62/301,558, filed on Feb. 29, 2016, provisional application No. 62/273,896, filed on Dec. 31, 2015, provisional application No. 62/265,937, filed on Dec. 10, 2015, provisional application No. 62/222,518, filed on Sep. 23, 2015, provisional application No. 62/217,872, filed on Sep. 12, 2015, provisional application No. 62/128,974, filed on Mar. 5, 2015, provisional application No. 62/082,579, filed on Nov. 20, 2014, provisional application No. 62/047,508, filed on Sep. 8, 2014, provisional application No. 62/023,800, filed on Jul. 11, 2014, provisional application No. 61/972,314, filed on Mar. 30, 2014, provisional application No. 61/953,878, filed on Mar. 16, 2014, provisional application No. 61/927,481, filed on Jan. 15, 2014, provisional application No. 61/924,252, filed on Jan. 7, 2014, provisional application No. 61/916,190, filed on Dec. 14, 2013, provisional application No. 61/867,007, filed on Aug. 16, 2013, provisional application No. 61/467,209, filed on Mar. 24, 2011, provisional application No. 61/447,464, filed on Feb. 28, 2011, provisional application No. 61/447,089, filed on Feb. 27, 2011, provisional application No. 61/439,913, filed on Feb. 6, 2011, provisional application No. 61/414,451, filed on Nov. 17, 2010, provisional application No. 61/388,002, filed on Sep. 30, 2010, provisional application No. 61/352,166, filed on Jun. 7, 2010.

(51) Int. Cl.
*G06N 20/00* (2019.01)
*G06T 3/00* (2006.01)
*G06T 7/73* (2017.01)
*G06V 10/764* (2022.01)
*G06V 20/59* (2022.01)
*G06V 40/16* (2022.01)

(52) U.S. Cl.
CPC .............. *G06T 7/73* (2017.01); *G06V 10/764* (2022.01); *G06V 20/59* (2022.01); *G06V 20/593* (2022.01); *G06V 40/171* (2022.01); *G06V 40/174* (2022.01); *B60W 2040/0818* (2013.01); *B60W 2540/229* (2020.02); *G06T 2207/20101* (2013.01); *G06T 2207/30201* (2013.01); *G06T 2207/30268* (2013.01)

(56) References Cited

U.S. PATENT DOCUMENTS

| | | |
|---|---|---|
| 3,870,034 A | 3/1975 | James |
| 4,353,375 A | 10/1982 | Colburn et al. |
| 4,448,203 A | 5/1984 | Williamson et al. |
| 4,794,533 A | 12/1988 | Cohen |
| 4,807,642 A | 2/1989 | Brown |
| 4,817,628 A | 4/1989 | Zealear et al. |
| 4,950,069 A | 8/1990 | Hutchinson |
| 4,964,411 A | 10/1990 | Johnson et al. |
| 5,016,282 A | 5/1991 | Tomono et al. |
| 5,031,228 A | 7/1991 | Lu |
| 5,219,322 A | 6/1993 | Weathers |
| 5,247,938 A | 9/1993 | Silverstein et al. |
| 5,259,390 A | 11/1993 | Maclean |
| 5,507,291 A | 4/1996 | Stirbl et al. |
| 5,572,596 A | 11/1996 | Wildes et al. |
| 5,619,571 A | 4/1997 | Sandstorm et al. |
| 5,647,834 A | 7/1997 | Ron |
| 5,649,061 A | 7/1997 | Smyth |
| 5,663,900 A | 9/1997 | Bhandari et al. |
| 5,666,215 A | 9/1997 | Fredlund et al. |
| 5,725,472 A | 3/1998 | Weathers |
| 5,741,217 A | 4/1998 | Gero |
| 5,760,917 A | 6/1998 | Sheridan |
| 5,762,611 A | 6/1998 | Lewis et al. |
| 5,772,508 A | 6/1998 | Sugita et al. |
| 5,772,591 A | 6/1998 | Cram |
| 5,774,591 A | 6/1998 | Black et al. |
| 5,802,220 A | 9/1998 | Black et al. |
| 5,825,355 A | 10/1998 | Palmer et al. |
| 5,886,683 A | 3/1999 | Tognazzini et al. |
| 5,898,423 A | 4/1999 | Tognazzini et al. |
| 5,920,477 A | 7/1999 | Hoffberg et al. |
| 5,945,988 A | 8/1999 | Williams et al. |
| 5,959,621 A | 9/1999 | Nawaz et al. |
| 5,969,755 A | 10/1999 | Courtney |
| 5,983,129 A | 11/1999 | Cowan et al. |
| 5,987,415 A | 11/1999 | Breese et al. |
| 6,004,061 A | 12/1999 | Manico et al. |
| 6,004,312 A | 12/1999 | Finneran et al. |
| 6,008,817 A | 12/1999 | Gilmore, Jr. |
| 6,026,321 A | 2/2000 | Miyata et al. |
| 6,026,322 A | 2/2000 | Korenman et al. |
| 6,056,781 A | 5/2000 | Wassick et al. |
| 6,067,565 A | 5/2000 | Horvitz |
| 6,088,040 A | 7/2000 | Oda et al. |
| 6,091,334 A | 7/2000 | Galiana et al. |
| 6,099,319 A | 8/2000 | Zaltman et al. |

(56) References Cited

U.S. PATENT DOCUMENTS

| | | |
|---|---|---|
| 6,134,644 A | 10/2000 | Mayuzumi et al. |
| 6,182,098 B1 | 1/2001 | Selker |
| 6,185,534 B1 | 2/2001 | Breese et al. |
| 6,195,651 B1 | 2/2001 | Handel et al. |
| 6,212,502 B1 | 4/2001 | Ball et al. |
| 6,222,607 B1 | 4/2001 | Szajewski et al. |
| 6,309,342 B1 | 10/2001 | Blazey et al. |
| 6,327,580 B1 | 12/2001 | Pierce et al. |
| 6,349,290 B1 | 2/2002 | Horowitz et al. |
| 6,351,273 B1 | 2/2002 | Lemelson et al. |
| 6,437,758 B1 | 8/2002 | Nielsen et al. |
| 6,443,840 B2 | 9/2002 | Von Kohorn |
| 6,530,082 B1 | 3/2003 | Del Sesto et al. |
| 6,577,329 B1 | 6/2003 | Flickner et al. |
| 6,606,102 B1 | 8/2003 | Odom |
| 6,629,104 B1 | 9/2003 | Parulski et al. |
| 6,724,920 B1 | 4/2004 | Berenz et al. |
| 6,792,458 B1 | 9/2004 | Muret et al. |
| 6,847,376 B2 | 1/2005 | Engeldrum et al. |
| 6,927,694 B1 | 8/2005 | Smith et al. |
| 7,003,135 B2 | 2/2006 | Hsieh et al. |
| 7,013,478 B1 | 3/2006 | Hendricks et al. |
| 7,027,621 B1 | 4/2006 | Prokoski |
| 7,110,570 B1 | 9/2006 | Berenz et al. |
| 7,113,916 B1 | 9/2006 | Hill |
| 7,120,880 B1 | 10/2006 | Dryer et al. |
| 7,197,459 B1 | 3/2007 | Harinarayan et al. |
| 7,233,684 B2 | 6/2007 | Fedorovskaya et al. |
| 7,246,081 B2 | 7/2007 | Hill |
| 7,263,474 B2 | 8/2007 | Fables et al. |
| 7,266,582 B2 | 9/2007 | Stelting |
| 7,307,636 B2 | 12/2007 | Matraszek et al. |
| 7,319,779 B1 | 1/2008 | Mummareddy et al. |
| 7,327,505 B2 | 2/2008 | Fedorovskaya et al. |
| 7,350,138 B1 | 3/2008 | Swaminathan et al. |
| 7,353,399 B2 | 4/2008 | Ooi et al. |
| 7,355,627 B2 | 4/2008 | Yamazaki et al. |
| 7,428,318 B1 | 9/2008 | Madsen et al. |
| 7,474,801 B2 | 1/2009 | Teo et al. |
| 7,496,622 B2 | 2/2009 | Brown et al. |
| 7,549,161 B2 | 6/2009 | Poo et al. |
| 7,551,755 B1 | 6/2009 | Steinberg et al. |
| 7,555,148 B1 | 6/2009 | Steinberg et al. |
| 7,558,408 B1 | 7/2009 | Steinberg et al. |
| 7,564,994 B1 | 7/2009 | Steinberg et al. |
| 7,573,439 B2 | 8/2009 | Lau et al. |
| 7,580,512 B2 | 8/2009 | Batni et al. |
| 7,584,435 B2 | 9/2009 | Bailey et al. |
| 7,587,068 B1 | 9/2009 | Steinberg et al. |
| 7,610,289 B2 | 10/2009 | Muret et al. |
| 7,620,934 B2 | 11/2009 | Falter et al. |
| 7,644,375 B1 | 1/2010 | Anderson et al. |
| 7,676,574 B2 | 3/2010 | Glommen et al. |
| 7,757,171 B1 | 7/2010 | Wong et al. |
| 7,826,657 B2 | 11/2010 | Zhang et al. |
| 7,830,570 B2 | 11/2010 | Morita et al. |
| 7,881,493 B1 | 2/2011 | Edwards et al. |
| 7,921,036 B1 | 4/2011 | Sharma |
| 8,010,458 B2 | 8/2011 | Galbreath et al. |
| 8,022,831 B1 | 9/2011 | Wood-Eyre |
| 8,219,438 B1 | 7/2012 | Moon et al. |
| 8,300,891 B2 | 10/2012 | Chen et al. |
| 8,369,608 B2 | 2/2013 | Gunaratne |
| 8,401,248 B1 | 3/2013 | Moon et al. |
| 8,442,638 B2 | 5/2013 | Libbus et al. |
| 8,522,779 B2 | 9/2013 | Lee et al. |
| 8,600,120 B2 | 12/2013 | Gonion et al. |
| 8,640,021 B2 | 1/2014 | Perez et al. |
| 8,947,217 B2 | 2/2015 | Moussa et al. |
| 10,322,728 B1 | 6/2019 | Porikli et al. |
| 2001/0033286 A1 | 10/2001 | Stokes et al. |
| 2001/0041021 A1 | 11/2001 | Boyle et al. |
| 2002/0007249 A1 | 1/2002 | Cranley |
| 2002/0030665 A1 | 3/2002 | Ano |
| 2002/0042557 A1 | 4/2002 | Bensen et al. |
| 2002/0054174 A1 | 5/2002 | Abbott et al. |
| 2002/0084902 A1 | 7/2002 | Zadrozny et al. |
| 2002/0171551 A1 | 11/2002 | Eshelman |
| 2002/0182574 A1 | 12/2002 | Freer |
| 2003/0035567 A1 | 2/2003 | Chang et al. |
| 2003/0037041 A1 | 2/2003 | Hertz |
| 2003/0060728 A1 | 3/2003 | Mandigo |
| 2003/0093784 A1 | 5/2003 | Dimitrova et al. |
| 2003/0182123 A1 | 9/2003 | Mitsuyoshi |
| 2003/0191682 A1 | 10/2003 | Shepard et al. |
| 2003/0191816 A1 | 10/2003 | Landress et al. |
| 2004/0181457 A1 | 9/2004 | Biebesheimer |
| 2005/0187437 A1 | 8/2005 | Matsugu |
| 2005/0210103 A1 | 9/2005 | Rui et al. |
| 2005/0283055 A1 | 12/2005 | Shirai et al. |
| 2005/0289582 A1 | 12/2005 | Tavares et al. |
| 2006/0011399 A1 | 1/2006 | Brockway et al. |
| 2006/0019224 A1 | 1/2006 | Behar et al. |
| 2006/0143647 A1 | 6/2006 | Bill |
| 2006/0149428 A1 | 7/2006 | Kim et al. |
| 2006/0170945 A1 | 8/2006 | Bill |
| 2006/0235753 A1 | 10/2006 | Kameyama |
| 2007/0167689 A1 | 7/2007 | Ramadas et al. |
| 2007/0173733 A1 | 7/2007 | Le et al. |
| 2007/0239787 A1 | 10/2007 | Cunningham et al. |
| 2007/0255831 A1 | 11/2007 | Hayashi et al. |
| 2007/0265507 A1 | 11/2007 | de Lemos |
| 2007/0299964 A1 | 12/2007 | Wong et al. |
| 2008/0059570 A1 | 3/2008 | Bill |
| 2008/0091512 A1 | 4/2008 | Marci et al. |
| 2008/0091515 A1 | 4/2008 | Thieberger et al. |
| 2008/0101660 A1 | 5/2008 | Seo |
| 2008/0103784 A1 | 5/2008 | Wong et al. |
| 2008/0167757 A1 | 7/2008 | Kanevsky et al. |
| 2008/0184170 A1 | 7/2008 | Periyalwar |
| 2008/0208015 A1 | 8/2008 | Morris et al. |
| 2008/0221472 A1 | 9/2008 | Lee et al. |
| 2008/0287821 A1 | 11/2008 | Jung et al. |
| 2008/0292151 A1 | 11/2008 | Kurtz et al. |
| 2009/0002178 A1 | 1/2009 | Guday et al. |
| 2009/0006206 A1 | 1/2009 | Groe |
| 2009/0083421 A1 | 3/2009 | Glommen et al. |
| 2009/0094286 A1 | 4/2009 | Lee et al. |
| 2009/0112694 A1 | 4/2009 | Jung et al. |
| 2009/0112810 A1 | 4/2009 | Jung et al. |
| 2009/0133048 A1 | 5/2009 | Gibbs et al. |
| 2009/0150919 A1 | 6/2009 | Lee et al. |
| 2009/0156907 A1 | 6/2009 | Jung et al. |
| 2009/0164132 A1 | 6/2009 | Jung et al. |
| 2009/0193344 A1 | 7/2009 | Smyers |
| 2009/0209829 A1 | 8/2009 | Yanagidaira et al. |
| 2009/0210290 A1 | 8/2009 | Elliott et al. |
| 2009/0217315 A1 | 8/2009 | Malik et al. |
| 2009/0259518 A1 | 10/2009 | Harvey |
| 2009/0263022 A1 | 10/2009 | Petrescu et al. |
| 2009/0270170 A1 | 10/2009 | Patton |
| 2009/0271417 A1 | 10/2009 | Toebes et al. |
| 2009/0285456 A1 | 11/2009 | Moon et al. |
| 2009/0299840 A1 | 12/2009 | Smith |
| 2010/0070523 A1 | 3/2010 | Delgo et al. |
| 2010/0099955 A1 | 4/2010 | Thomas et al. |
| 2010/0134302 A1 | 6/2010 | Ahn et al. |
| 2010/0266213 A1 | 10/2010 | Hill |
| 2010/0274847 A1 | 10/2010 | Anderson et al. |
| 2010/0324437 A1 | 12/2010 | Freeman |
| 2011/0126226 A1 | 5/2011 | Makhlouf |
| 2011/0134026 A1 | 6/2011 | Kang et al. |
| 2011/0143728 A1 | 6/2011 | Holopainen et al. |
| 2011/0144971 A1 | 6/2011 | Danielson |
| 2011/0196855 A1 | 8/2011 | Wable et al. |
| 2011/0231240 A1 | 9/2011 | Schoen et al. |
| 2011/0251493 A1 | 10/2011 | Poh et al. |
| 2011/0263946 A1 | 10/2011 | el Kaliouby et al. |
| 2012/0109452 A1 | 5/2012 | Autran et al. |
| 2012/0150430 A1 | 6/2012 | French et al. |
| 2012/0271484 A1 | 10/2012 | Feit et al. |
| 2012/0324491 A1 | 12/2012 | Bathiche et al. |
| 2013/0023337 A1 | 1/2013 | Bowers et al. |
| 2013/0044958 A1 | 2/2013 | Brandt et al. |

(56) References Cited

U.S. PATENT DOCUMENTS

| | | | |
|---|---|---|---|
| 2013/0116587 | A1 | 5/2013 | Sommo et al. |
| 2013/0121584 | A1 | 5/2013 | Bourdev et al. |
| 2013/0197409 | A1 | 8/2013 | Baxter et al. |
| 2014/0171752 | A1 | 6/2014 | Park et al. |
| 2014/0172910 | A1 | 6/2014 | Jung et al. |
| 2014/0218187 | A1 | 8/2014 | Chun et al. |
| 2014/0276090 | A1 | 9/2014 | Breed |
| 2014/0310208 | A1* | 10/2014 | Fasel ............... G06N 20/00 706/12 |
| 2015/0258995 | A1 | 9/2015 | Essers et al. |
| 2015/0314454 | A1* | 11/2015 | Breazeal ............ G10L 15/32 700/259 |
| 2016/0104486 | A1 | 4/2016 | Penilla et al. |
| 2017/0003784 | A1 | 1/2017 | Garg et al. |
| 2017/0297587 | A1 | 10/2017 | Mimura et al. |
| 2018/0050696 | A1* | 2/2018 | Misu ............... A61B 5/7282 |
| 2018/0251122 | A1* | 9/2018 | Golston ........... B60W 50/0098 |
| 2019/0049965 | A1* | 2/2019 | Tanriover ............ G08G 1/01 |
| 2019/0135325 | A1 | 5/2019 | Lisseman et al. |
| 2019/0176837 | A1 | 6/2019 | Williams et al. |
| 2019/0213406 | A1* | 7/2019 | Porikli ............. G06V 40/113 |
| 2019/0225232 | A1* | 7/2019 | Blau ............... G05D 1/0088 |
| 2019/0304160 | A1* | 10/2019 | Izumi ............... H04N 13/117 |
| 2019/0325605 | A1* | 10/2019 | Ye .................. G06F 18/2431 |
| 2020/0103980 | A1 | 4/2020 | Katz et al. |
| 2020/0171977 | A1* | 6/2020 | Jales Costa ........... B60N 2/002 |
| 2020/0223362 | A1* | 7/2020 | Witte ................ H04N 7/188 |
| 2020/0285871 | A1 | 9/2020 | Tokizaki et al. |
| 2020/0130528 | A1 | 10/2020 | Upmanue et al. |

FOREIGN PATENT DOCUMENTS

| | | |
|---|---|---|
| KR | 10-2008-0016303 A | 2/2008 |
| KR | 1020100048688 A | 5/2010 |
| WO | WO 2011/045422 A1 | 4/2011 |

OTHER PUBLICATIONS

International Search Report dated Nov. 14, 2011 for PCT/US2011/39282.

International Search Report dated Apr. 16, 2012 for PCT/US2011/054125.

International Search Report dated May 24, 2012 for PCT/US2011/060900.

Xiaoyu Wang, An HOG-LBP human detector with partial occlusion handling, Sep. 29, 2009, IEEE 12th International Conference on Computer Vision, Kyoto, Japan.

Zhihong Zeng, A Survey of Affect Recognition Methods: Audio, Visual, and Spontaneous Expressions, Jan. 2009, IEEE Transactions on Pattern Analysis and Machine Intelligence, vol. 31, No. 1.

Nicholas R. Howe and Amanda Ricketson, Improving the Boosted Correlogram, 2004, Lecture Notes in Computer Science, ISSN 0302-9743, Springer-Verlag, Germany.

Xuming He, et al, Learning and Incorporating Top-Down Cues in Image Segmentation, 2006, Lecture Notes in Computer Science, ISBN 978-3-540-33832-1, Springer-Verlag, Germany.

Ross Eaton, et al, Rapid Training of Image Classifiers through Adaptive, Multi-frame Sampling Methods, Oct. 2008, IEEE 37th Applied Imagery Pattern Recognition Workshop, Washington DC.

Verkruysse, Wim, Lars O. Svaasand, and J. Stuart Nelson. "Remote plethysmographic imaging using ambient light." Optics express 16.26 (2008): 21434-21445.

Albiol, Alberto, et al. "Face recognition using HOG-EBGM." Pattern Recognition Letters 29.10 (2008): 1537-1543.

Fasel, B. (Aug. 2002). Robust face analysis using convolutional neural networks. In Object recognition supported by user interaction for service robots (vol. 2, pp. 40-43). IEEE.

Matsugu, M., Mori, K., Mitari, Y., & Kaneda, Y. (2003). Subject independent facial expression recognition with robust face detection using a convolutional neural network. Neural Networks, 16(5-6), 555-559.

Ferry, Q., Steinberg, J., Webber, C., FitzPatrick, D. R., Ponting, C. P., Zisserman, A., & Nellåker, C. (2014). Diagnostically relevant facial gestalt information from ordinary photos. Elife, 3, e02020.

El Maghraby, A., Abdalla, M., Enany, O., & El Nahas, M. Y. (2014). Detect and analyze face parts information using Viola-Jones and geometric approaches. International Journal of Computer Applications, 101(3), 23-28.

Wang, C., & Song, X. (Mar. 2011). Tracking facial feature points with prediction-assisted view-based active shape model. In Face and Gesture 2011 (pp. 259-264). IEEE.

Du, S., Zheng, N., You, Q., Wu, Y., Yuan, M., & Wu, J. (Oct. 2006). Rotated haar-like features for face detection with in-plane rotation. In International Conference on Virtual Systems and Multimedia (pp. 128-137). Springer, Berlin, Heidelberg.

Arca, S., Campadelli, P., & Lanzarotti, R. (2006). A face recognition system based on automatically determined facial fiducial points. Pattern recognition, 39(3), 432-443.

Cardinaux, F., Sanderson, C., & Marcel, S. (Jun. 2003). Comparison of MLP and GMM classifiers for face verification on XM2VTS. In International Conference on Audio-and Video-based Biometric Person Authentication (pp. 911-920). Springer, Berlin, Heidelberg.

\* cited by examiner

VEHICULAR IN-CABIN FACIAL TRACKING USING MACHINE LEARNING

RELATED APPLICATIONS

This application claims the benefit of U.S. provisional patent applications "Vehicle Interior Object Management" Ser. No. 62/893,298, filed Aug. 29, 2019, "Deep Learning In Situ Retraining" Ser. No. 62/925,990, filed Oct. 25, 2019, "Data Versioning for Neural Network Training" Ser. No. 62/926,009, filed Oct. 25, 2019, "Synthetic Data Augmentation for Neural Network Training" Ser. No. 62/954,819, filed Dec. 30, 2019, "Synthetic Data for Neural Network Training Using Vectors" Ser. No. 62/954,833, filed Dec. 30, 2019, and "Autonomous Vehicle Control Using Longitudinal Profile Generation" Ser. No. 62/955,493, filed Dec. 31, 2019.

This application is also a continuation-in-part of U.S. patent application "Vehicular In-Cabin Sensing Using Machine Learning" Ser. No. 16/833,828, filed May 1, 2020, which claims the benefit of U.S. provisional patent applications "Synthetic Data Augmentation for Neural Network Training" Ser. No. 62/954,819, filed Dec. 30, 2019, "Synthetic Data for Neural Network Training Using Vectors" Ser. No. 62/954,833, filed Dec. 30, 2019, "Autonomous Vehicle Control Using Longitudinal Profile Generation" Ser. No. 62/955,493, filed Dec. 31, 2019, "Image Analysis for Human Perception Artificial Intelligence" Ser. No. 62/827,088, filed Mar. 31, 2019, "Vehicle Interior Object Management" Ser. No. 62/893,298, filed Aug. 29, 2019, "Deep Learning In Situ Retraining" Ser. No. 62/925,990, filed Oct. 25, 2019, and "Data Versioning for Neural Network Training" Ser. No. 62/926,009, filed Oct. 25, 2019.

This application is also a continuation-in-part of U.S. patent application "Robot Navigation for Personal Assistance" Ser. No. 16/781,334, filed Feb. 4, 2020, which claims the benefit of U.S. provisional patent applications "Synthetic Data Augmentation for Neural Network Training" Ser. No. 62/954,819, filed Dec. 30, 2019, "Synthetic Data for Neural Network Training Using Vectors" Ser. No. 62/954,833, filed Dec. 30, 2019, and "Autonomous Vehicle Control Using Longitudinal Profile Generation" Ser. No. 62/955,493, filed Dec. 31, 2019.

The U.S. patent application "Robot Navigation for Personal Assistance" Ser. No. 16/781,334, filed Feb. 4, 2020 is a continuation-in-part of U.S. patent application "Electronic Display Viewing Verification" Ser. No. 16/726,647, filed Dec. 24, 2019, which claims the benefit of U.S. provisional patent applications "Image Analysis for Human Perception Artificial Intelligence" Ser. No. 62/827,088, filed Mar. 31, 2019, "Vehicle Interior Object Management" Ser. No. 62/893,298, filed Aug. 29, 2019, "Deep Learning In Situ Retraining" Ser. No. 62/925,990, filed Oct. 25, 2019, and "Data Versioning for Neural Network Training" Ser. No. 62/926,009, filed Oct. 25, 2019.

The U.S. patent application "Electronic Display Viewing Verification" Ser. No. 16/726,647, filed Dec. 24, 2019, claims the benefit of U.S. provisional patent applications "Image Analysis for Human Perception Artificial Intelligence" Ser. No. 62/827,088, filed Mar. 31, 2019, "Vehicle Interior Object Management" Ser. No. 62/893,298, filed Aug. 29, 2019, "Deep Learning In Situ Retraining" Ser. No. 62/925,990, filed Oct. 25, 2019, and "Data Versioning for Neural Network Training" Ser. No. 62/926,009, filed Oct. 25, 2019.

The U.S. patent application "Electronic Display Viewing Verification" Ser. No. 16/726,647, filed Dec. 24, 2019, is also a continuation-in-part of U.S. patent application "Facial Tracking With Classifiers For Query Evaluation" Ser. No. 14/672,328, filed Mar. 30, 2015, which claims the benefit of U.S. provisional patent applications "Speech Analysis for Cross-Language Mental State Identification" Ser. No. 62/593,449, filed Dec. 1, 2017, "Avatar Image Animation using Translation Vectors" Ser. No. 62/593,440, filed Dec. 1, 2017, "Directed Control Transfer for Autonomous Vehicles" Ser. No. 62/611,780, filed Dec. 29, 2017, "Cognitive State Vehicle Navigation Based on Image Processing" Ser. No. 62/625,274, filed Feb. 1, 2018, "Cognitive State Based Vehicle Manipulation Using Near Infrared Image Processing" Ser. No. 62/637,567, filed Mar. 2, 2018, and "Vehicle Manipulation Using Cognitive State" Ser. No. 62/679,825, filed Jun. 3, 2018.

The U.S. patent application "Facial Tracking With Classifiers For Query Evaluation" Ser. No. 14/672,328, filed Mar. 30, 2015 is also a continuation-in-part of U.S. patent application "Facial Tracking with Classifiers" Ser. No. 14/848,222, filed Sep. 8, 2015 which claims the benefit of U.S. provisional patent applications "Facial Tracking with Classifiers" Ser. No. 62/047,508, filed Sep. 8, 2014, "Semiconductor Based Mental State Analysis" Ser. No. 62/082,579, filed Nov. 20, 2014, and "Viewership Analysis Based on Facial Evaluation" Ser. No. 62/128,974, filed Mar. 5, 2015.

The U.S. patent application "Facial Tracking with Classifiers" Ser. No. 14/848,222, filed Sep. 8, 2015 is also a continuation-in-part of U.S. patent application "Mental State Analysis Using Web Services" Ser. No. 13/153,745, filed Jun. 6, 2011, which claims the benefit of U.S. provisional patent applications "Mental State Analysis Through Web Based Indexing" Ser. No. 61/352,166, filed Jun. 7, 2010, "Measuring Affective Data for Web-Enabled Applications" Ser. No. 61/388,002, filed Sep. 30, 2010, "Sharing Affect Across a Social Network" Ser. No. 61/414,451, filed Nov. 17, 2010, "Using Affect Within a Gaming Context" Ser. No. 61/439,913, filed Feb. 6, 2011, "Recommendation and Visualization of Affect Responses to Videos" Ser. No. 61/447,089, filed Feb. 27, 2011, "Video Ranking Based on Affect" Ser. No. 61/447,464, filed Feb. 28, 2011, and "Baseline Face Analysis" Ser. No. 61/467,209, filed Mar. 24, 2011.

The U.S. patent application "Facial Tracking with Classifiers" Ser. No. 14/848,222, filed Sep. 8, 2015 is also a continuation-in-part of U.S. patent application "Mental State Analysis Using an Application Programming Interface" Ser. No. 14/460,915, Aug. 15, 2014, which claims the benefit of U.S. provisional patent applications "Application Programming Interface for Mental State Analysis" Ser. No. 61/867,007, filed Aug. 16, 2013, "Mental State Analysis Using an Application Programming Interface" Ser. No. 61/924,252, filed Jan. 7, 2014, "Heart Rate Variability Evaluation for Mental State Analysis" Ser. No. 61/916,190, filed Dec. 14, 2013, "Mental State Analysis for Norm Generation" Ser. No. 61/927,481, filed Jan. 15, 2014, "Expression Analysis in Response to Mental State Express Request" Ser. No. 61/953,878, filed Mar. 16, 2014, "Background Analysis of Mental State Expressions" Ser. No. 61/972,314, filed Mar. 30, 2014, and "Mental State Event Definition Generation" Ser. No. 62/023,800, filed Jul. 11, 2014.

The U.S. patent application "Mental State Analysis Using an Application Programming Interface" Ser. No. 14/460,915, Aug. 15, 2014 is also a continuation-in-part of U.S. patent application "Mental State Analysis Using Web Services" Ser. No. 13/153,745, filed Jun. 6, 2011, which claims the benefit of U.S. provisional patent applications "Mental State Analysis Through Web Based Indexing" Ser. No.

61/352,166, filed Jun. 7, 2010, "Measuring Affective Data for Web-Enabled Applications" Ser. No. 61/388,002, filed Sep. 30, 2010, "Sharing Affect Across a Social Network" Ser. No. 61/414,451, filed Nov. 17, 2010, "Using Affect Within a Gaming Context" Ser. No. 61/439,913, filed Feb. 6, 2011, "Recommendation and Visualization of Affect Responses to Videos" Ser. No. 61/447,089, filed Feb. 27, 2011, "Video Ranking Based on Affect" Ser. No. 61/447,464, filed Feb. 28, 2011, and "Baseline Face Analysis" Ser. No. 61/467,209, filed Mar. 24, 2011.

The U.S. patent application "Facial Tracking With Classifiers For Query Evaluation" Ser. No. 14/672,328, filed Mar. 30, 2015 is also a continuation-in-part of U.S. patent application "Image Analysis for Attendance Query Evaluation" Ser. No. 15/061,385, filed Mar. 4, 2016, which claims the benefit of U.S. provisional patent applications "Viewership Analysis Based on Facial Evaluation" Ser. No. 62/128,974, filed Mar. 5, 2015, "Mental State Event Signature Usage" Ser. No. 62/217,872, filed Sep. 12, 2015, "Image Analysis In Support of Robotic Manipulation" Ser. No. 62/222,518, filed Sep. 23, 2015, "Analysis of Image Content with Associated Manipulation of Expression Presentation" Ser. No. 62/265,937, filed Dec. 12, 2015, "Image Analysis Using Sub-Sectional Component Evaluation To Augment Classifier Usage" Ser. No. 62/273,896, filed Dec. 31, 2015, and "Analytics for Live Streaming Based on Image Analysis within a Shared Digital Environment" Ser. No. 62/301,558, filed Feb. 29, 2016.

The U.S. patent application "Image Analysis for Attendance Query Evaluation" Ser. No. 15/061,385, filed Mar. 4, 2016 is also a continuation-in-part of U.S. patent application "Facial Tracking with Classifiers" Ser. No. 14/848,222, filed Sep. 8, 2015 which claims the benefit of U.S. provisional patent applications "Facial Tracking with Classifiers" Ser. No. 62/047,508, filed Sep. 8, 2014, "Semiconductor Based Mental State Analysis" Ser. No. 62/082,579, filed Nov. 20, 2014, and "Viewership Analysis Based On Facial Evaluation" Ser. No. 62/128,974, filed Mar. 5, 2015.

The U.S. patent application "Image Analysis for Attendance Query Evaluation" Ser. No. 15/061,385, filed Mar. 4, 2016 is also a continuation-in-part of U.S. patent application "Measuring Affective Data for Web-Enabled Applications" Ser. No. 13/249,317, filed Sep. 30, 2011 which claims the benefit of U.S. provisional patent applications "Measuring Affective Data for Web-Enabled Applications" Ser. No. 61/388,002, filed Sep. 30, 2010, "Sharing Affect Data Across a Social Network" Ser. No. 61/414,451, filed Nov. 17, 2010, "Using Affect Within a Gaming Context" Ser. No. 61/439,913, filed Feb. 6, 2011, "Recommendation and Visualization of Affect Responses to Videos" Ser. No. 61/447,089, filed Feb. 27, 2011, "Video Ranking Based on Affect" Ser. No. 61/447,464, filed Feb. 28, 2011, and "Baseline Face Analysis" Ser. No. 61/467,209, filed Mar. 24, 2011.

The U.S. patent application "Robot Navigation for Personal Assistance" Ser. No. 16/781,334, filed Feb. 4, 2020 is also a continuation-in-part of U.S. patent application "Image Analysis In Support Of Robotic Manipulation" Ser. No. 15/273,765, filed Sep. 23, 2016, which claims the benefit of U.S. provisional patent applications "Image Analysis In Support of Robotic Manipulation" Ser. No. 62/222,518, filed Sep. 23, 2015, "Analysis of Image Content with Associated Manipulation of Expression Presentation" Ser. No. 62/265,937, filed Dec. 12, 2015, "Image Analysis Using Sub-Sectional Component Evaluation To Augment Classifier Usage" Ser. No. 62/273,896, filed Dec. 31, 2015, "Analytics for Live Streaming Based on Image Analysis within a Shared Digital Environment" Ser. No. 62/301,558, filed Feb. 29, 2016, and "Deep Convolutional Neural Network Analysis of Images for Mental States" Ser. No. 62/370,421, filed Aug. 3, 2016.

The patent application "Image Analysis In Support Of Robotic Manipulation" Ser. No. 15/273,765, filed Sep. 23, 2016, is also a continuation-in-part of U.S. patent application "Mental State Event Definition Generation" Ser. No. 14/796,419, filed Jul. 10, 2015 which claims the benefit of U.S. provisional patent applications "Mental State Event Definition Generation" Ser. No. 62/023,800, filed Jul. 11, 2014, "Facial Tracking with Classifiers" Ser. No. 62/047,508, filed Sep. 8, 2014, "Semiconductor Based Mental State Analysis" Ser. No. 62/082,579, filed Nov. 20, 2014, and "Viewership Analysis Based On Facial Evaluation" Ser. No. 62/128,974, filed Mar. 5, 2015.

The patent application "Mental State Event Definition Generation" Ser. No. 14/796,419, filed Jul. 10, 2015 is also a continuation-in-part of U.S. patent application "Mental State Analysis Using Web Services" Ser. No. 13/153,745, filed Jun. 6, 2011, which claims the benefit of U.S. provisional patent applications "Mental State Analysis Through Web Based Indexing" Ser. No. 61/352,166, filed Jun. 7, 2010, "Measuring Affective Data for Web-Enabled Applications" Ser. No. 61/388,002, filed Sep. 30, 2010, "Sharing Affect Across a Social Network" Ser. No. 61/414,451, filed Nov. 17, 2010, "Using Affect Within a Gaming Context" Ser. No. 61/439,913, filed Feb. 6, 2011, "Recommendation and Visualization of Affect Responses to Videos" Ser. No. 61/447,089, filed Feb. 27, 2011, "Video Ranking Based on Affect" Ser. No. 61/447,464, filed Feb. 28, 2011, and "Baseline Face Analysis" Ser. No. 61/467,209, filed Mar. 24, 2011.

The patent application "Mental State Event Definition Generation" Ser. No. 14/796,419, filed Jul. 10, 2015 is also a continuation-in-part of U.S. patent application "Mental State Analysis Using an Application Programming Interface" Ser. No. 14/460,915, Aug. 15, 2014, which claims the benefit of U.S. provisional patent applications "Application Programming Interface for Mental State Analysis" Ser. No. 61/867,007, filed Aug. 16, 2013, "Mental State Analysis Using an Application Programming Interface" Ser. No. 61/924,252, filed Jan. 7, 2014, "Heart Rate Variability Evaluation for Mental State Analysis" Ser. No. 61/916,190, filed Dec. 14, 2013, "Mental State Analysis for Norm Generation" Ser. No. 61/927,481, filed Jan. 15, 2014, "Expression Analysis in Response to Mental State Express Request" Ser. No. 61/953,878, filed Mar. 16, 2014, "Background Analysis of Mental State Expressions" Ser. No. 61/972,314, filed Mar. 30, 2014, and "Mental State Event Definition Generation" Ser. No. 62/023,800, filed Jul. 11, 2014.

The patent application "Mental State Event Definition Generation" Ser. No. 14/796,419, filed Jul. 10, 2015 is also a continuation-in-part of U.S. patent application "Mental State Analysis Using Web Services" Ser. No. 13/153,745, filed Jun. 6, 2011, which claims the benefit of U.S. provisional patent applications "Mental State Analysis Through Web Based Indexing" Ser. No. 61/352,166, filed Jun. 7, 2010, "Measuring Affective Data for Web-Enabled Applications" Ser. No. 61/388,002, filed Sep. 30, 2010, "Sharing Affect Across a Social Network" Ser. No. 61/414,451, filed Nov. 17, 2010, "Using Affect Within a Gaming Context" Ser. No. 61/439,913, filed Feb. 6, 2011, "Recommendation and Visualization of Affect Responses to Videos" Ser. No. 61/447,089, filed Feb. 27, 2011, "Video Ranking Based on Affect" Ser. No. 61/447,464, filed Feb. 28, 2011, and "Baseline Face Analysis" Ser. No. 61/467,209, filed Mar. 24, 2011.

Each of the foregoing applications is hereby incorporated by reference in its entirety.

FIELD OF INVENTION

This application relates generally to machine learning and more particularly to vehicular in-cabin facial tracking using machine learning.

BACKGROUND

Looking at a human face provides dynamic, varied, and plentiful information. Facial data can convey a mood and a mental state or states of a person. Humans are particularly good at processing facial information for a variety of purposes. Perhaps foremost among the varied purposes is social interaction. Social interaction can occur among strangers, friends, family members, and so on. Understanding facial data is critical to personal safety and even survival in some cases, and it is used for basic human activities like social interactions including cooperation, locating a partner, etc. Facial data can be used to rapidly identify whether a stranger appears friendly and approachable or appears dangerous and should be avoided. Similarly, understanding facial data can be used to quickly determine a friend's mood, the mental state of a family member, and so on.

People expend a substantial amount of time traveling, irrespective of the transportation mode is chosen. Whatever the purpose of transportation, or whichever transportation mode is chosen, people spend a substantial amount of time traveling. Waiting for, traveling in, or parking the vehicle, and waiting in security lines to board the vehicle, among many other travel-related activities, all consume or waste time. Travel is at its best a long process, and at its worst, a boring and vexatious one. Travel or commuting time is time that is lost from productive activities such as work, study, art, family, and so on. Rush hour traffic, accidents, and poorly maintained roads further complicate vehicular transportation. Travel difficulties are exacerbated by operating an unfamiliar vehicle, traveling in an unfamiliar city, or even having to remember to drive on different sides of the road. Failure to address these transportation realities can lead to catastrophe. Irritated vehicle operators can experience road rage and other acutely antisocial behaviors. Bored, sleepy, impaired, distracted, or inattentive drivers can initiate vehicular accidents that can cause damage to property, and tragically, can cause injury to themselves or other vehicle occupants, pedestrians, bicyclists, pets, or wild animals.

SUMMARY

In disclosed techniques, vehicular in-cabin facial tracking is performed using machine learning. In-cabin sensor data of a vehicle interior is collected. The in-cabin sensor data includes images of the vehicle interior. A set of seating locations for the vehicle interior is determined. The set is based on the images. The set of seating locations is scanned for performing facial detection for each of the seating locations using a facial detection model. A view of a detected face is manipulated. The manipulation is based on a geometry of the vehicle interior. Cognitive state data of the detected face is analyzed. The cognitive state data analysis is based on additional images of the detected face. The cognitive state data analysis uses the view that was manipulated. The cognitive state data analysis is promoted to a using application. The using application provides vehicle manipulation information to the vehicle. The manipulation information is for an autonomous vehicle.

The detected face belongs to an occupant of the vehicle. The vehicle occupant can be the vehicle driver or operator, a passenger within the vehicle, a child in a car seat within the vehicle, and so on. A location or position for the vehicle occupant can be determined, as can a metric that describes a human perception. The human perception metric can be based on one or more occupants of the vehicle and can be determined based on analysis of images of the vehicle occupant. The human perception metric can comprise an analysis of the cognitive state data of the person whose face is detected. The cognitive state data analysis can be used by an application, where the application can operate an autonomous or semiautonomous vehicle, can recommend vehicle content, etc. The vehicle content that can be recommended can include audio or video selections, where the audio or video selections may be recommended from a library, a stream, and so on.

Images of a vehicle interior can be collected. The images can include video, intermittent video, still images, and the like. The images can include upper torso data. The vehicle can be a first vehicle, a second vehicle, a third vehicle, a public transportation vehicle, etc. The images can include images based on various spectra of light such as visible light images or near-infrared (NIR) images. Other in-vehicle sensors can be used for data collection, such as a microphone for collecting audio data or voice data, and other sensors to collect physiological data. An occupant within the vehicle interior can be detected based on the images. The detection can be based on image processing techniques such as edge detection, vehicle occupant recognition, etc. The detection of the occupant can be based on identifying an upper torso of the occupant. A location for the occupant within the vehicle interior is determined. The occupant can be located at the front of or to the back of the vehicle. The occupant can be in a driver or operator position for the vehicle. The occupant can be a passenger within the vehicle. The using application can include manipulation of an autonomous or semiautonomous vehicle, content recommendations, etc.

A computer-implemented method for facial analysis is disclosed comprising: collecting in-cabin sensor data of a vehicle interior, wherein the in-cabin sensor data includes images of the vehicle interior; determining a set of seating locations for the vehicle interior, based on the images; scanning the set of seating locations for performing facial detection for each of the seating locations using a facial detection model; manipulating a view of a detected face, based on a geometry of the vehicle interior; and analyzing cognitive state data of the detected face, based on additional images of the detected face, using the view that was manipulated. In some embodiments, the cognitive state data is promoted to a using application. In some embodiments, the vehicle manipulation information is provided to the vehicle from the using application. In some embodiments, the using application uses network connectivity remote from the vehicle to provide the manipulation information. Some embodiments include manipulation information for an autonomous or semi-autonomous vehicle.

In some embodiments, the method further includes obtaining audio information from the occupant of the vehicle and augmenting the determining based on the audio information. The audio information can include speech, non-speech vocalizations, and so on. The non-speech vocalizations can include grunts, yelps, squeals, snoring, sighs, laughter, filled pauses, unfilled pauses, or yawns. Further embodiments include obtaining physiological information from the occupant of the vehicle and augmenting the analyzing based on the physiological information. The physiological information can include heart rate, heart rate variability, respiration rate, skin conductivity, and so on. The occupant of the vehicle can be a driver or operator of the vehicle, a passenger within the vehicle, a custodial driver of the vehicle, etc. The vehicle in which the individual is traveling can be an autonomous vehicle or a semiautonomous vehicle.

Various features, aspects, and advantages of numerous embodiments will become more apparent from the following description.

BRIEF DESCRIPTION OF THE DRAWINGS

The following detailed description of certain embodiments may be understood by reference to the following figures wherein.

DETAILED DESCRIPTION

Figure 1:
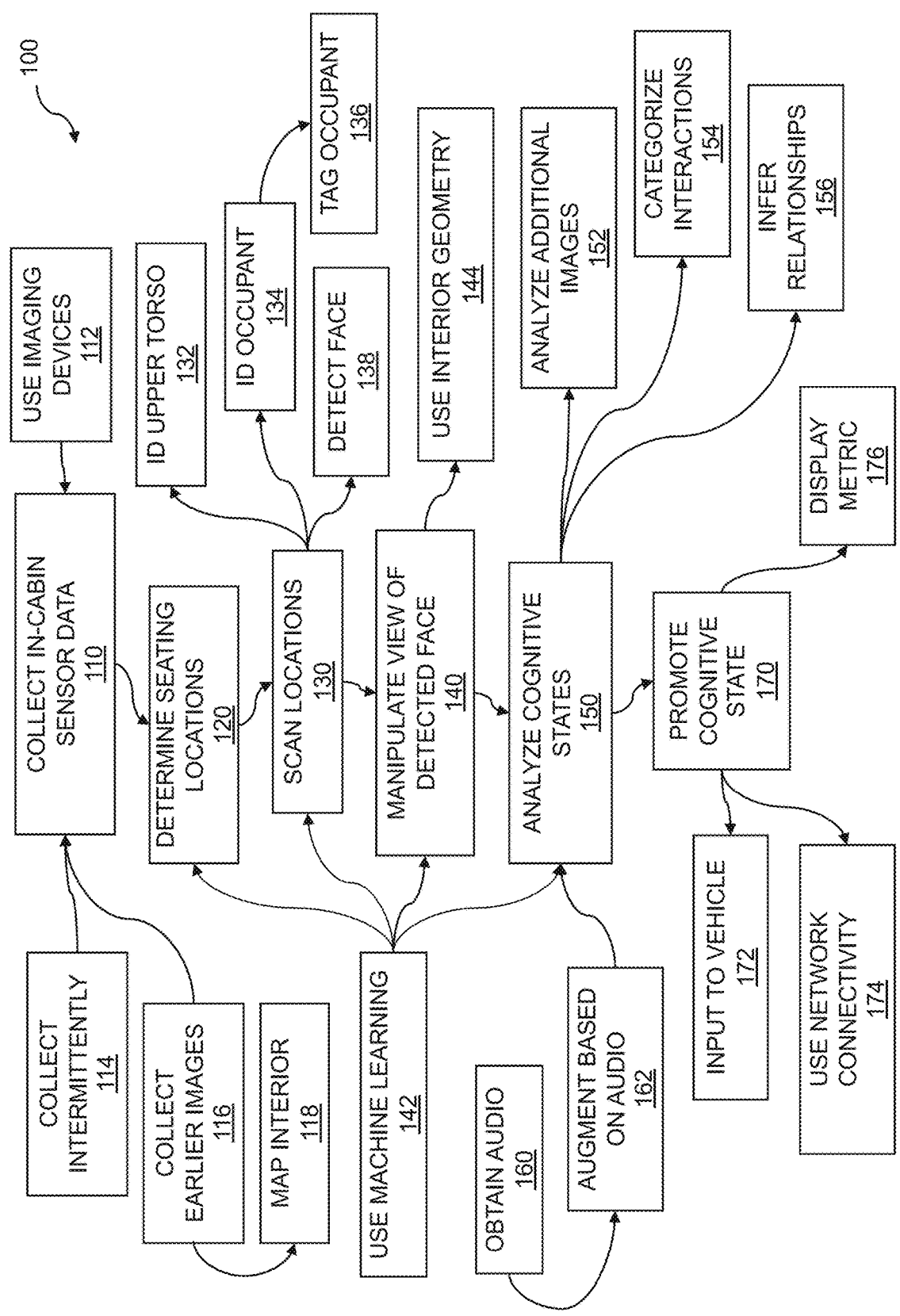
FIG. 1 is a flow diagram for vehicular in-cabin facial tracking using machine learning.

Individuals can choose where they want to reside. The residences chosen can be located in areas as diverse as sparsely populated rolling hills, open plains, and woodlands, or densely populated cities. Those individuals, whether they live in rural, urban, or suburban areas, spend hundreds or more hours per year traveling in vehicles. The vehicles that are most frequently used for travel include public vehicles such as buses, trains, or airplanes; private vehicles such as automobiles or motorcycles; commercial vehicles such as taxis or ride share vehicles; and so on. The hours spent by individuals in vehicles are consumed by commuting to and from work or school, running errands, keeping meetings and appointments, traveling, etc. As an individual is traveling within or atop a vehicle, that individual can experience a wide range of emotional states, mental states, and cognitive states. Emotional state, mental state, cognitive state, and so on, are terms of art which may connote slight differences of emphasis, for example an emotional state of "happiness" vs. a cognitive state of "distractedness," but at a high level, the terms can often be used interchangeably. In fact, because the human mind of an individual is often difficult to understand, even for the individual, emotional, mental, and cognitive states may easily be overlapping and appropriately used in a general sense. The type and range of cognitive states can be determined by analyzing cognitive state data collected from the individual. The cognitive state data that is analyzed can include image data, facial data, audio data, voice data, speech data, non-speech vocalizations, physiological data, and the like. In addition to the analysis of the cognitive state data from images, audio, etc., a history of content ingestion can be obtained from the vehicle occupant. The ingestion history can include one or more audio or video selections that were made by the vehicle occupant, offered to the vehicle occupant, and so on. The cognitive state can be correlated to the content ingestion history. The correlating can include a cognitive state such as "happy" occurring when a particular audio or video selection was playing.

In the disclosed materials, vehicular in-cabin facial tracking is performed using machine learning. In-cabin sensor data of a vehicle interior is collected. The in-cabin sensor data includes images of the vehicle interior. A set of seating locations for the vehicle interior is determined. The set is based on the images. The set of seating locations is scanned for performing facial detection for each of the seating locations using a facial detection model. A view of a detected face is manipulated. The manipulation is based on a geometry of the vehicle interior. Cognitive state data of the detected face is analyzed. The cognitive state data analysis is based on additional images of the detected face. The cognitive state data analysis uses the view that was manipulated. The cognitive state data analysis is promoted to a using application. The using application provides vehicle manipulation information to the vehicle. The manipulation information is for an autonomous vehicle.

Images of a vehicle interior are collected. The images can include visible light images, near infrared images, etc. Various devices can be used for the imaging. The imaging devices can include cameras, where the cameras can include a video camera, a still camera, a camera array, a plenoptic camera, a web-enabled camera, a visible light camera, a near-infrared (NIR) camera, a heat camera, and so on. An occupant within the vehicle interior is detected based on the images. Detection of the occupant is based on identifying an upper torso of the occupant. A location for the occupant within the vehicle interior is determined. The location for the occupant can include the front of the vehicle or the back of the vehicle, or, in vehicles so equipped, the "way back" third seat or farther. The location for the occupant can include a driver or operator position, or a passenger position. The occupant can be standing or sitting. A human perception metric for the vehicle occupant is determined based on the images. A human perception metric can include a quantification of activity, involvement, cognitive load, distractedness, drowsiness, or impairment evaluation for the occupant, demographics, mood, etc. The mood can include one or more of sadness, stress, happiness, anger, frustration, confusion, disappointment, hesitation, cognitive overload, focusing, engagement, attention, boredom, exploration, confidence, trust, delight, disgust, skepticism, doubt, satisfaction, excitement, laughter, calmness, curiosity, humor, depression, envy, sympathy, embarrassment, poignancy, or mirth. The human perception metric can be promoted to a using application. The using application can include a controller for an autonomous or semiautonomous vehicle; a selector for audio or video content provided within the vehicle; a navigator; etc.

FIG. 1 is a flow diagram for vehicular in-cabin facial tracking performed using machine learning. In-cabin sensor data of a vehicle interior is collected. The in-cabin sensor data includes images of the vehicle interior. A set of seating locations for the vehicle interior is determined. The set is based on the images. The set of seating locations is scanned for performing facial detection for each of the seating locations using a facial detection model. A view of a detected face is manipulated. The manipulation is based on a geometry of the vehicle interior. Cognitive state data of the detected face is analyzed. The cognitive state data analysis is based on additional images of the detected face. The cognitive state data analysis uses the view that was manipulated. The cognitive state data analysis is promoted to a using application. The using application provides vehicle manipulation information to the vehicle. The manipulation information is for an autonomous vehicle. One or more occupants are detected within the vehicle interior based on the images. The detection of the occupant can be based on identifying an upper torso of the occupant or by identifying a face for the occupant. A location for the occupant within the vehicle interior is determined, and locations for other occupants who may be present within the vehicle interior are determined as well.

The flow 100 includes collecting in-cabin sensor data 110 of a vehicle interior. The in-cabin sensor data can include images collected within the vehicle. The images include video, still images, near-infrared (NIR) images, and so on. The images can include two or more images. The two or more images can include video, video frames, still images, etc. In embodiments, the images can be accomplished using a plurality of imaging devices 112 within a vehicle comprising the vehicle interior. The imaging devices can include cameras or other imaging devices. A camera can include a webcam, a video camera, a still camera, a thermal imager, a CCD device, a phone camera, a three-dimensional camera, a depth camera, a light field camera, multiple webcams used to show different views of a person, or any other type of image capture apparatus that can allow captured data to be used in an electronic system. In other embodiments, an imaging device within the plurality of imaging devices can include an infrared imaging device. The images can be collected continuously. In other embodiments, the images can be collected on an intermittent basis 114. The intermittent collecting can be based on availability of an imaging device, a clear line of sight within the vehicle, available lighting, etc. Additional images can be collected, where the additional images can include video images, still images, etc. In embodiments, the additional images are collected from the vehicle interior. Collection of images can occur at various points in time. In embodiments, the additional images can be collected during a current vehicle journey by an occupant. The images can be collected during other vehicle journeys. In embodiments, the additional images can be collected during a previous vehicle journey by the occupant. The images that are collected may or may not include the vehicle occupant. Further embodiments include collecting earlier images 116 from the vehicle interior prior to the occupant arriving at the vehicle. The collecting earlier images from the vehicle interior prior to the occupant arriving at the vehicle can be used for a variety of techniques. In embodiments, the collecting earlier images can include mapping 118 the vehicle interior based on the earlier images. The mapping can include indicating a driver, operator, or controller position within the vehicle; passenger positions within the vehicle; a car seat within the vehicle; etc. In embodiments, the in-cabin sensor data can comprise seat-pressure sensors, such as those used to determine if a seatbelt warning should be activated. Other sensors such as thermal sensors, manual input sensors, car seat sensors, etc. can be used.

The flow 100 includes determining a set of seating locations 120 for an occupant within the vehicle interior based on the images. The detecting of the seating locations within the vehicle interior can be based on one or more image analysis techniques. The image analysis techniques can include edge detection, identification of landmarks, identification of regions, and the like. The image analysis techniques can be based on using one or more classifiers. For example, a typical vehicle may have two seats in a front row, including a driver's seat, and three seats in a second or back row. The image analysis techniques can determine and tag each potential seating location for use in facial tracking. Alternatively, the seating locations can be based on a catalog of vehicle type and verified using the images. The vehicle seating locations tend to be static, however, they can change for vehicle interior rearrangements, such as folding down part of a split back row seat back for cargo stowage or strapping a child's or infant's car seat into a semi-permanent spot. In some cases, the interior rearrangement can occur while the vehicle is in motion. The seating locations can then be used as a basis for scanning vehicle locations 130, as discussed below.

The flow 100 includes scanning the set of seating locations 130 to determine if an occupant of the vehicle is present at that location the vehicle interior. As stated throughout, the occupant within the vehicle can be located at various positions within the vehicle. The occupant can be located toward the front of the vehicle or the back of the vehicle, near the middle of the vehicle, to the left of the vehicle or the right of the vehicle, and so on. Various image analysis techniques can be employed to detect an occupant, including detecting a face 138. The location of the occupant within the vehicle can include a driver, operator, supervisor, or similar position within the vehicle. The location of the occupant within the vehicle can include a passenger position. In embodiments, the vehicle seating data can include an occupant count for the vehicle. The location of other occupants of the vehicle can also be determined. Further embodiments include determining a location for the second occupant. The locations of the one or more occupants within the vehicle can be mapped. In embodiments, the vehicle seating data includes a vehicle seating map. Once a seating map is known, then only a small portion of the image data need be processed, that is, all image data outside of occupied seating locations can be ignored or cropped out of further computations. In embodiments, the performing facial detection is accomplished using a full-view facial detection model. In embodiments, the full-view facial detection model is processed remotely from the vehicle.

In embodiments, detection of the occupant is based on identifying an upper torso 132 of the occupant. The identifying the upper torso of the occupant further can be based on extracting upper body data for the occupant from the images. In embodiments, the upper body data is used to identify the upper torso of the occupant. Other techniques can be included with the detecting the occupant within the vehicle. In embodiments, the detecting can include vehicle occupant identification 134. The vehicle occupant identification can be based on analyzing images or other data that can be collected from the vehicle occupant. In embodiments, the vehicle occupant identification is performed without facial data. The vehicle occupant identification can be based on other data such as audio data, discussed below. In embodiments, the vehicle occupant identification can include tagging an occupant 136 with an identifier. The tagging can be based on a label, a number, a code, and the like. Further embodiments include detecting a second occupant within the vehicle interior. Switching seats by the occupant(s), say, at a rest stop, can be detected based on the occupant ID and tag.

The flow 100 includes manipulating a view of a detected face 140. The manipulating can be based on the geometry of the vehicle interior 144. For example, the in-cabin sensor may comprise a single camera mounted on the interior rearview mirror. In order to capture images of the entire vehicle interior, the camera may be equipped with a wide-angle lens. The single camera vantage point and the wide-angle lens can cause different views of each vehicle occupant in each vehicle seating location. In such an example, the front seat occupants can appear bigger than the back seat occupants, and the left-side occupants can display a different aspect of their faces than would the right-side occupants. Dealing with such image discrepancies can require extensive—and sometimes unavailable—computing power to perform image analysis and cognitive state analysis. Manipulating the view can enable a much less computationally intensive load for, especially, embedded applications performing facial tracking using machine learning. The manipulating the view can include stretching back seat images to a predetermined size to simplify analysis, rotating front seat images left or right toward a centerline of the vehicle to account for the left-right skew of the incoming images, combining multiple views for multiple camera image inputs, adjusting the lighting to accommodate interior lighting differences, and so on. Having an image manipulated into a known form factor, aspect ratio, or lighting scenario can enable use of a much smaller landmark model instead of requiring a full-blown facial recognition model.

The flow 100 includes analyzing cognitive states 150 of a vehicle occupant, based on further analysis of the in-cabin sensor data. An occupant of the vehicle can experience a range of cognitive states. The cognitive states can be based on an experience of the vehicle occupant while traveling within the vehicle relative to a climate within the vehicle or content presented within the vehicle; external stimuli such as traffic situations or road conditions; and the like. In embodiments, the determining, the scanning, the manipulating, and the analyzing can be performed using deep learning or machine learning 142. The deep learning can be used to accomplish image analysis, occupant detection, location determination, a seating map, cognitive state determination, human perception metric determination, and the like. The deep learning can be based on using a neural network. In embodiments, the deep learning can be performed using a convolutional neural network. Other types of neural networks can also be used for deep learning. In further embodiments, the deep learning is performed using a recurrent neural network. In embodiments, the analyzing is performed using a landmark model. And in embodiments, the landmark model is processed in an embedded processor.

In some embodiments, the cognitive state that was analyzed can include a human perception metric for the vehicle occupant based on the in-cabin sensor data. A human perception metric can be a quantification of interactions, perceptions, cognitive efforts, and so on, associated with one or more vehicle occupants. This human perception metric can be an evaluation of a person (or group of people) and how that person interacts with their environment or objects around them, including possibly a vehicle in which they are an occupant. Discussed throughout, a human perception metric can be used for a variety of applications. A human perception metric can be a function of an object, control, adjustment, etc., with which a person is interacting. In embodiments, the vehicle occupant can be interacting with a vehicle control. The vehicle control can include an adjustment control for cabin climate, a mirror, a seat, a sun shade, a moon roof, an entertainment system, and so on. The vehicle control can include cruise control, a steering wheel, a brake or accelerator, or some other vehicle control. In other embodiments, the vehicle occupant can be interacting with an object within the vehicle. The object can include an inanimate object such as a cell phone, smartphone, tablet, personal digital assistant (PDA), global positioning system (GPS), a map or atlas, etc. A human perception metric can be based on perception. The perception can include how a person, such as the vehicle occupant, perceives their environment. Perceptions relating to the environment can include urban or rural, ugly or beautiful, dangerous or safe, and the like. Perceptions relating to the environment around the person can include heavy traffic, ease of driving, hazardous driving conditions such as weather-related hazards, and so on.

A human perception metric can be related to cognitive effort or cognitive load. Cognitive effort or cognitive load can be related to how a person can use their working memory. Working memory can include a human cognitive system with relatively limited capacity. The person's working memory can be used for temporary storage in which information can be held and processed. Working memory is different from long term memory in that working memory can be used for the information processing while long term memory is used for storing or "remembering" information. Cognitive load can be generally categorized using three descriptions. The first category can include intrinsic cognitive load. Intrinsic cognitive load can include an amount of cognitive effort that can relate to a specific task such as adding a column of numbers or adjusting ingredient amounts for a recipe. The second category can include extraneous cognitive load. Extraneous cognitive load can refer to one or more techniques that can be used for presenting tasks, information, and so on, to a learner. Extraneous cognitive load can refer to how the information is presented rather that what information is presented. The third category can include germane cognitive load. Germane cognitive load can refer to an amount of cognitive work required to create a permanent store of knowledge. The permanent store of knowledge can include a schema, where the schema can be used to organize one or more categories for information. The schema further can be used to organize or define relationships between and among the categories for the information.

The human perception metric can be determined based on more than one occupant within the vehicle. In embodiments, the human perception metric can be based on the occupant and the second occupant within the vehicle interior. The human perception metric can be based on a variety of data relating to one or more occupants within the vehicle. In embodiments, the human perception metric can include an activity by the occupant. The activity by the occupant can include talking, sleeping, texting, calling on a cell phone, and the like. Some embodiments include determining in-vehicle human activity based on the in-cabin sensor data. In other embodiments, the human perception metric can include an involvement metric by the occupant. The involvement metric can be based on the occupant being involved with other occupants of the vehicle. In further embodiments, the human perception metric can include a cognitive load for the occupant. The cognitive load for the occupant can include an amount of effort being expended by the occupant to perform tasks such as operating the vehicle. In embodiments, the human perception metric can include information on involvement with a vehicle control. Involvement with a vehicle control can include operating the vehicle, adjusting the climate within the vehicle, selecting content for the vehicle, etc. Determining the human perception metric can include information on involvement with an object. Further embodiments include determining interaction between the vehicle occupant and an inanimate object. The inanimate object can include a cell phone, smartphone, tablet, PDA, etc. In further embodiments, the human perception metric can include a distractedness, drowsiness, or impairment evaluation for the occupant. The distractedness evaluation can be based on inattention, distraction, impairment, etc. A drowsiness evaluation can be based on a reduced blink rate, eye closes, eye close duration, head dips, and so on. A drowsiness evaluation can be based on sounds, such as snoring, produced by the vehicle occupant. An impairment evaluation can be based on slowed reaction times, eye gaze direction, failure to dim high beam lights to low beam lights, and the like. In embodiments, the human perception metric can include vehicle occupant demographics. The occupant demographics can describe characteristics of the occupant, choices made by the occupant, and the like. The occupant demographics can include one or more of age, gender identity, cultural identity, racial identity, or geographic location. In further embodiments, the human perception metric can include a mood for the vehicle occupant. The human perception metric can also include an emotional state, a mental state, a cognitive state, etc. In embodiments, the mood can include one or more of sadness, stress, happiness, anger, frustration, confusion, disappointment, hesitation, cognitive overload, focusing, engagement, attention, boredom, exploration, confidence, trust, delight, disgust, skepticism, doubt, satisfaction, excitement, laughter, calmness, curiosity, humor, depression, envy, sympathy, embarrassment, poignancy, or mirth. The mood can be determined for more than one occupant within the vehicle. The moods of the vehicle occupants can be aggregated, combined, averaged, etc. In embodiments, the human perception metric can include a mood for the vehicle, based on the occupant.

In the flow 100, the analyzing cognitive states can be based on analysis of additional images of the vehicle occupant 152 or other in-cabin sensor data. The additional images can be collected using a camera, an imaging device, etc., as described throughout, which can be the same or different sensors used for other data collection. The determining the human perception metric can be based on analysis of additional images of other vehicle occupants. A human perception metric of one vehicle occupant can be related to one or more human perception metrics of one or more additional occupants within the vehicle. The additional images can include visible light images, video, or video frames; NIR images; etc. In the flow 100, the analyzing includes categorizing human interactions 154 between the occupant and a second occupant. The human interactions can include talking, giving instructions or directions, and the like. The human interactions can include friendly interactions or non-friendly interactions. The flow 100 further includes inferring relationships 156 between the occupant and the second occupant. Various types of relationships can be inferred between the occupant and the second or further occupants. In embodiments, the relationships can include friendship, enmity, stranger awareness, aggression, and so on. Some embodiments analyze additional cognitive state data of additional detected faces.

The flow 100 further includes obtaining audio information 160. The audio information can be obtained using a microphone, a transducer, or some other audio capture device. The audio information can include audio obtained within the vehicle, outside the vehicle, adjacent to the vehicle, etc. The audio information can include noise such as road noise, ambient noise within a cityscape, entertainment center audio, and the like. In embodiments, the audio information can include speech. The speech can include speech produced by the vehicle occupant, the second vehicle occupant, or other vehicle occupants. In other embodiments, the audio information includes non-speech vocalizations. The non-speech vocalizations can include humming or singing, exclamations, etc. In embodiments, the non-speech vocalizations can include grunts, yelps, squeals, snoring, sighs, laughter, filled pauses, unfilled pauses, or yawns. The audio information that is obtained can be used for a variety of purposes. In the flow 100, the purposes for which the audio information can be used include augmenting 162 the analyzing based on the audio information. The augmenting the analyzing can include improving convergence of the cognitive state analysis.

The flow 100 includes promoting the cognitive state 170 to a using application. A variety of applications, algorithms, heuristics, etc., can receive the promoted human perception metric. The applications can include command and control of a vehicle, recommendation of vehicle entertainment content, planning or recommendation for travel route, recommendation of occupant action, for example, "stop texting" or "how about taking a break," and the like. In embodiments, the application can include a vehicle safety system such as an advanced driver assistance system (ADAS). The ADAS system can be used to enhance car safety and road safety by assisting the driver to operate the vehicle in a safer manner. In embodiments, the ADAS can be adaptive. The ADAS system can perform various operations such as collision avoidance, pedestrian or animal avoidance, adaptive cruise control, lane departure warnings, lane centering control, vehicle proximity warnings, and the like. The ADAS system can couple to a vehicle occupant's smartphone, relay traffic or weather warnings, and the like. In other embodiments, the application can include an infotainment system. An infotainment system can present audio and/or video. Infotainment systems can provide information in a humorous, entertaining, or nonthreatening manner, relying more on the entertainment aspects rather than the information to keep a consumer engaged with the content. In further embodiments, the application can include an in-vehicle voice assistant. The in-vehicle voice assistant can be used to determine a vehicle travel route, to control a phone call, to operate the infotainment system, and the like. In other embodiments, an application can include one or more environmental controls within the vehicle. The one or more environmental controls can include climate controls such as heating and cooling; vehicle interior lighting; seat adjustments such as position, firmness, support, or temperature; vehicle control position such as steering wheel tilt or proximity; instrument cluster position; and so on.

In the flow 100, the promoting includes input to an autonomous or semiautonomous vehicle 172. The input to the autonomous or semiautonomous vehicle can include steering, acceleration or braking, navigation, collision avoidance, etc. In embodiments, the input can include vehicle experience optimization for the vehicle occupant. Vehicle experience optimization can include seat adjustment, mirror adjustment, climate control, entertainment selection, and the like. The experience optimization can include choosing a travel route that is beautiful, that experiences fewer traffic issues, that is less stressful to the vehicle occupant, and so on. In the flow 100, the promoting uses network connectivity 174. The network connectivity can be used to enable communication between a local, in-vehicle processing device and a remote processing device, such as a web server or a cloud server. The network connectivity can facilitate usage of a software development kit (SDK), where certain steps are performed on a remote, high-powered CPU and other steps are performed locally. In this way SDK facilitates model fragmentation across different hardware platforms. The in-vehicle processing device can be an embedded processor enabled by loading a portion of the method described herein using an SDK. For example, the in-vehicle sensor can comprise the self-contained camera of a smart phone, and the smart phone can be enabled to process the image data based on the functionality downloaded via the SDK. Thus in embodiments, the embedded processor is located within the vehicle. And in embodiments, the embedded processor is located within a mobile device. Thus in embodiments, the machine learning is fragmented across a plurality of hardware platforms. And in embodiments, the analyzing is performed using models provided through a software development kit (SDK).

In embodiments, the promoting includes displaying the cognitive state or a related cognitive state metric 176, such as a human perception metric. The metric can be displayed within the vehicle using an in-vehicle display or heads-up display; displayed on a personal electronic device associated with the vehicle occupant such as a smartphone or tablet; displayed on a display visible from the vehicle; etc. The displaying can comprise various forms of conveyance, including visual, haptic, and/or auditory conveyance.

The promoting the metric can include promoting a metric to one or more applications that can support communication between the vehicle and other vehicles. Vehicle to vehicle or "V2V" communication can include exchanging information between or among various types of vehicles. In embodiments, V2V communication includes communication between or among autonomous vehicles, semiautonomous vehicles, and the like. V2V communications can be used to share vehicle information such as speed, location, direction, destination, and the like. The V2V communication can be used for collision avoidance, vehicle proximity side to side, vehicle distance fore and aft of the vehicle, etc. The V2V communications can also support forms of communication such as networking. In embodiments, V2V communication can enable creation of ad hoc networks between or among vehicles. In other embodiments, communication can include vehicle to infrastructure or "V2I" communication. As transportation infrastructure such as roads, signals, intersections, and the like, becomes more intelligent, vehicles such as autonomous vehicles can communicate with the infrastructure using V2I communication. V2I communication can include traffic conditions, weather conditions, travel route information, and the like. V2I infrastructure can further include communication from one or more platforms such as an e-commerce platform. Communication from an e-commerce platform can include information relating to local amenities such as restaurants or hotels, local attractions such as parks or natural areas, local art galleries or museums, and the like. Communication with an e-commerce platform can include making reservations for plays, the theater, etc.; changing airline tickets; and so on. V2V and V2I communications can be based on a state such as a cognitive state of the occupant of the vehicle. An angry, distracted, or impaired driver, for example, can pose serious risk to other vehicles and vehicle occupants. By exchanging V2V or V2I information between or among vehicles, other vehicles can be directed to avoid the vehicle containing the problematic operator. In embodiments, V2V or V2I communications can be used to alert authorities that a particular vehicle occupant is impaired, can contact emergency services for a sick vehicle occupant, and the like. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
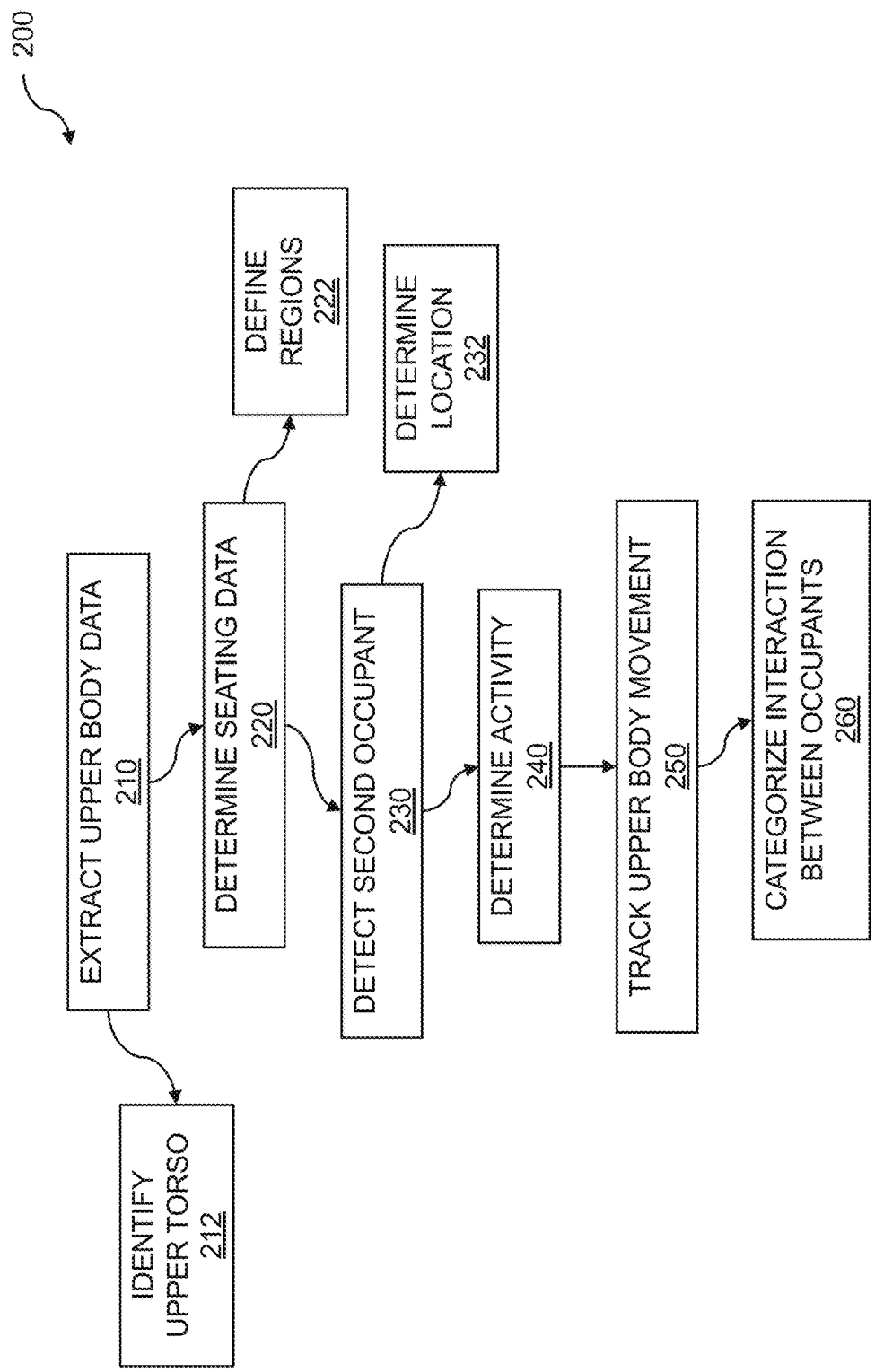
FIG. 2 is a flow diagram for interactions.

FIG. 2 is a flow diagram for interactions. Interactions can occur between one or more occupants of a vehicle. The interactions can be determined based on in-cabin sensor data analysis using machine learning. Vehicular in-cabin facial tracking is performed using machine learning. In-cabin sensor data of a vehicle interior is collected. The in-cabin sensor data includes images of the vehicle interior. A set of seating locations for the vehicle interior is determined. The set is based on the images. The set of seating locations is scanned for performing facial detection for each of the seating locations using a facial detection model. A view of a detected face is manipulated. The manipulation is based on a geometry of the vehicle interior. Cognitive state data of the detected face is analyzed. The cognitive state data analysis is based on additional images of the detected face. The cognitive state data analysis uses the view that was manipulated.

The flow 200 includes extracting upper body data for the occupant from the images 210. The extraction of upper body data can be accomplished using one or more image analysis techniques. Upper body data can be more consistently available than facial data for the occupant, which can easily be occluded or obscured by glasses, hats, shadows, hands, phones or other devices; head turning; head nodding; and so on. The image analysis techniques can include edge detection, feature extraction, region identification, and so on. The image analysis techniques can include classifiers running in a machine learning system. In embodiments, the upper body data can be used to identify the upper torso 212 of the occupant. The identifying the upper torso of the occupant can include image processing techniques such as image rotation, scaling, translation, etc. The upper torso can exclude facial images. Other in-cabin sensor data, such as cabin temperature map sensing, can be used. The cabin temperature map sensing can be based on near infrared imaging or other imaging. The flow 200 includes determining seating data 220 for the occupant based on the location for the occupant. The seating data can include the position of the vehicle occupant within the vehicle. The seating position can include a driver, operator, or controller position; a passenger position; and the like. In embodiments, the seating is based on in-cabin, in-seat occupant detectors similar to those used for passenger airbag activation. The flow 200 includes defining regions 222 within the vehicle interior. The regions can include a front-seat region and a back-seat region. The regions can further include a third-row seat region. Some embodiments include tracking the detected face within a single region of the vehicle interior. Some embodiments include scaling the detected face based on a location of the single region.

The flow 200 includes detecting a second occupant 230 within the vehicle interior. More than two people, such as passengers on a bus, a train, an airplane, a ship, etc., can occupy a vehicle. The flow 200 includes determining a location for the second occupant 232. The second occupant can be the driver, operator, or controller of the vehicle; a passenger within the vehicle; etc. The second occupant can be a co-controller, such as a copilot, of the vehicle. The one or more occupants of the vehicle can be identified. In embodiments, the detecting of one or more vehicle occupants can include vehicle occupant identification. Vehicle occupant identification can be based on recognition techniques such as image recognition or audio recognition. Vehicle occupant identification can be based on an occupant ID, profile, etc. In embodiments, the vehicle occupant identification can include tagging an occupant with an identifier. The tagging can include a generic tag such as "occupant 1", a number, a code, etc. In embodiments, the vehicle occupant identification can be performed without facial data. The flow 200 further includes determining human activity 240 based on the images. The human activity can be determined based on motion between frames of a video, translation of the individual between still images, etc. In embodiments, the human activity can include eating, sleeping, talking among vehicle occupants, applying makeup, texting on a cell phone, and talking on a cell phone. Applying makeup can be a human activity performed by the vehicle driver, the vehicle passenger, etc. Applying makeup can be a concern due to distractedness of a driver. In embodiments, applying makeup can be enhanced by selectively setting lighting within the vehicle. The flow 200 further includes tracking upper body movement 250 of the vehicle occupant, based on analysis of further additional images. The upper body movement of the vehicle occupant can be based on operating the vehicle, moving around within the vehicle, interacting with another passenger within the vehicle, and the like. In embodiments, a much less computationally intense model, such a facial landmark model, can be used to track movement, especially facial movement.

In the flow 200, determining human perception metrics (discussed throughout) includes categorizing human interactions between the occupant and a second occupant 260. Various types of interactions can occur between occupants of the vehicle. An occupant can be providing directions or instructions for a driver or operator of a vehicle. Two or more occupants can be engaged in conversation. Other interactions between and among occupants can also occur. Various inferences can be drawn based on the interactions. Further embodiments include inferring relationships between the occupant and the second occupant. Various types of relationships can be inferred. In embodiments, the relationships can include friendship, enmity, stranger awareness, or aggression. Interactions can occur between the vehicle occupant and one or more objects. In embodiments, the interaction occurs between the vehicle occupant and an inanimate object. The inanimate object can include a smartphone, cell phone, tablet, PDA, or other personal electronic device.

Figure 3:
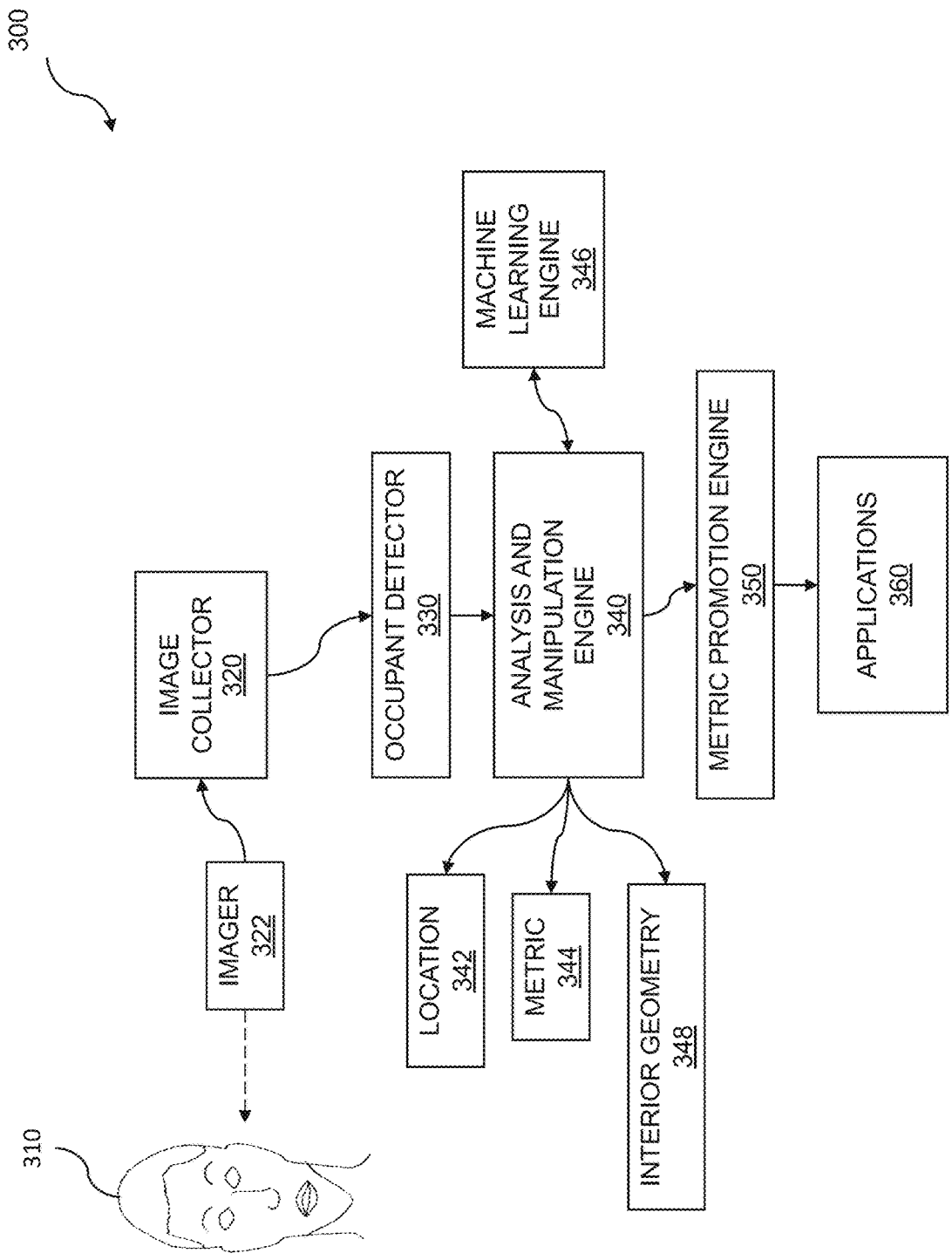
FIG. 3 is a diagram of a vehicular in-cabin facial tracking machine learning system.

FIG. 3 is a diagram of a vehicular in-cabin sensing machine learning system. The system is used to accomplish in-cabin sensing-based artificial intelligence (AI). Vehicular in-cabin facial tracking is performed using machine learning. In-cabin sensor data of a vehicle interior is collected. The in-cabin sensor data includes images of the vehicle interior. A set of seating locations for the vehicle interior is determined. The set is based on the images. The set of seating locations is scanned for performing facial detection for each of the seating locations using a facial detection model. A view of a detected face is manipulated. The manipulation is based on a geometry of the vehicle interior. Cognitive state data of the detected face is analyzed. The cognitive state data analysis is based on additional images of the detected face. The cognitive state data analysis uses the view that was manipulated. Audio information is obtained and is used to augment the determining of a human perception metric.

The system 300 for human perception artificial intelligence can be used on one or more of a variety of types of processors. In embodiments, the processor can be included in a vehicle. The in-vehicle processor can include a built-in processor, server, etc. In other embodiments, the processor can include a processor associated with the vehicle occupant, where the processor associated with the vehicle occupant can include a processor coupled to a personal electronic device such as a smartphone, a tablet, a PDA, and the like. The processor can include a processor located beyond the vehicle such as a server, a remote server, a cloud-based server, a grid server, etc. In embodiments, the system 300 can operate on one or more embedded systems, where the one or more embedded systems can include an automotive embedded system. An automotive embedded system can include a control system for an autonomous or semiautonomous vehicle.

In the system 300, a person 310 can be observed. The person can be an occupant of a vehicle and can be operating or traveling within the vehicle, viewing a video or media presentation, and so on. An image collector 320 can use an imager 322 to collect images of the person. The image collector can collect video, still images, and the like. The image collector can use one or more imagers to collect images based on differing spectra of light. The differing spectra of light can include visible light, near-infrared (NIR) light, etc. While one person is shown, in embodiments, other numbers of occupants can be present within the vehicle. An occupant detector 330 can be used to detect an occupant within the vehicle interior. The occupant detector can detect an occupant based on identifying an upper torso of the occupant. The occupant detector can be used to detect whether there are further occupants within the vehicle. Further embodiments can include detecting a second occupant within the vehicle interior. More than two occupants can be detected within the vehicle. In embodiments, additional images of the vehicle occupant can be collected. The additional images can be collected at various points in time. In embodiments, the additional images can be collected during a current vehicle journey by the occupant. The additional images can be collected during other vehicle journeys. In embodiments, additional images that can be collected within the vehicle interior can include images that were collected during a previous vehicle journey by the occupant. The additional images can be collected using image collectors beyond the vehicle, where beyond the vehicle can include outside the vehicle. In further embodiments, additional images can be collected from an interior of a second vehicle. The images that are collected need not include the vehicle occupant. Further embodiments can include collecting earlier images from the vehicle interior prior to the occupant arriving at the vehicle.

The system can include an analysis and manipulation engine 340. The analysis engine can be used to make a variety of determinations regarding one or more vehicle occupants, one or more human perception metrics, and the like. In embodiments, the analysis and manipulation engine 340 can be used for determining a location 342 for the occupant within the vehicle interior. The location of the occupant can include a position within the vehicle such as toward the front of the vehicle, near the middle of the vehicle, toward the rear of the vehicle, to the left within the vehicle, to the right within the vehicle, etc. The determining location can include determining that the vehicle occupant is located at a driver, operator, or controller position; a passenger position; and the like. The determining location can include determining location for more than one occupant within the vehicle. Further embodiments can include determining seating data for the occupant based on the location for the occupant. The determining engine can be used for determining a location for the second occupant.

The analysis and manipulation engine 340 can be used determine one or more human perception metrics 344. In embodiments, the determination engine can be used for determining a human perception metric for the vehicle occupant based on the images. More than one human perception metric can be determined. In embodiments, the human perception metric can include an activity by the occupant. The activity by the occupant can include reading, talking, sleeping, and so on. The human perception metric can include an involvement metric by the occupant. The involvement can include involvement information indicating involvement with a vehicle control. The vehicle control can include climate control, mirror adjustment, entertainment selection, etc. The involvement metric can include information on involvement with an object inside the vehicle. The object within the vehicle can be a personal object such as a smartphone or tablet. The human perception metric can include a cognitive load for the occupant. Cognitive load for a vehicle occupant can refer to expending an amount of energy to perform a task, to sort tasks, to create a store of knowledge, etc. The cognitive load can be related to the cognitive state of the vehicle occupant. In embodiments, the cognitive state can include drowsiness, fatigue, distraction, impairment, sadness, stress, happiness, anger, frustration, confusion, disappointment, hesitation, cognitive overload, focusing, engagement, attention, boredom, exploration, confidence, trust, delight, disgust, skepticism, doubt, satisfaction, excitement, laughter, calmness, curiosity, humor, depression, envy, sympathy, embarrassment, poignancy, or mirth. The human perception metric can include a distractedness, drowsiness, or impairment evaluation for the occupant. The distractedness, drowsiness, or impairment evaluation can be based on orientation of the upper torso of the vehicle occupant such as a forward orientation within the vehicle. The distractedness, drowsiness, or impairment evaluation can be based on reaction time, cognitive state, cognitive load, etc. The human perception metric can include vehicle occupant demographics. Various demographic information related to the vehicle occupant can be used. The vehicle occupant demographics can include one or more of age, gender identity, cultural identity, racial identity, geographic location, and so on.

The analysis and manipulation engine 340 can be based on a geometry of the vehicle interior 348. The geometry can inform possible seating locations for the vehicle. The interior geometry can be determined by sensor input, such as image data for the vehicle cabin. In some embodiments, the geometry of the vehicle interior is provided as predetermined information for a given vehicle (e.g., make/model/year/options for an automobile).

The determining, whether for occupant location, human perception metric, and so on, can be performed using deep learning. The deep learning can be performed by a deep learning or machine learning engine 346. Deep learning can be based on learning one or more representations related to data, such as location data or human perception data, rather than relying on algorithms that can be specific to a given data analysis task. Data representations, such as those based on feature learning, include techniques for automating the discovery, by a deep learning system, of representations that can be used to classify or detect features in raw data. In embodiments, the learning is performed using a deep neural network. A deep neural network can include an input layer, an output layer, and hidden layers internal to the neural network. A deep learning network can use weights, biases, and layers that can be learned as part of training the deep neural network. A deep neural network can include a feed-forward network, in which data such as training data or raw data can flow from an input layer, through the neural network, to an output layer. In other embodiments, the learning is performed using a convolutional neural network (CNN). A convolutional neural network can include properties such as space invariance, shift invariance, or translation invariance, which are properties that are particularly useful for image analysis. A CNN can require little preprocessing of input data because the CNN can learn filters. The learning the filters can obviate the need to code the filters. The filters can enhance image classification tasks such as upper torso data or upper body data analysis. In further embodiments, the learning is performed using a recurrent neural network. A recurrent neural network (RNN) can include connections between nodes to form a directed graph. The directed graph can be along a sequence. An RNN can exhibit temporal behavior by using storage internal to the RNN to process input data sequences.

The system can include a metric promotion engine 350. The metric promotion engine can be used to promote the one or more human perception metrics that are determined by the analysis and manipulation engine 340 to one or more applications 360. The metrics can be based on cognitive state data that is analyzed. The promotion engine can act as an interface between the determination engine and the applications. The promotion engine can include a software development kit (SDK), an interface or "middleware", and the like. The types of applications to which the metric promotion engine promotes the one or more human perception metrics can include control applications. The control applications can include applications for control of vehicles such as autonomous vehicles, semiautonomous vehicles, and so on. The types of applications to which the metric promotion engine promotes the one or more human perception metrics can include recommendation applications. The recommendation application can include recommendations for travel routes, recommendations to take a break from traveling, etc. The recommendation application can include recommending vehicle content such as video content, audio content, etc.

Figure 4:
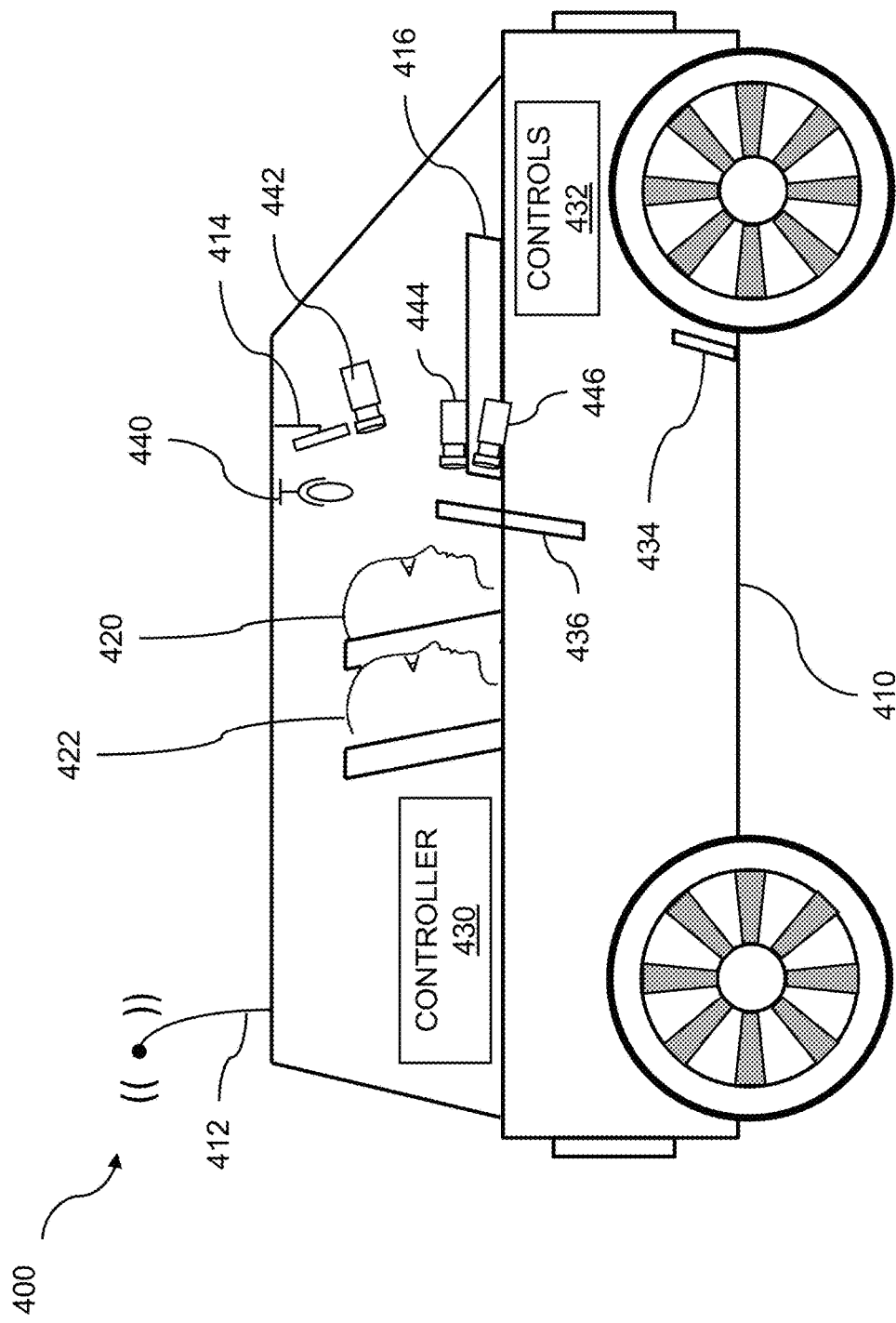
FIG. 4 is a system diagram for an interior of a vehicle.

FIG. 4 is a system diagram for an interior of a vehicle 400. The system can support vehicular in-cabin facial tracking using machine learning. In-cabin sensor data of a vehicle interior is collected. The in-cabin sensor data includes images of the vehicle interior. A set of seating locations for the vehicle interior is determined. The set is based on the images. The set of seating locations is scanned for performing facial detection for each of the seating locations using a facial detection model. A view of a detected face is manipulated. The manipulation is based on a geometry of the vehicle interior. Cognitive state data of the detected face is analyzed. The cognitive state data analysis is based on additional images of the detected face. The cognitive state data analysis uses the view that was manipulated. One or more occupants of a vehicle 410, such as occupants 420 and 422, can be observed by using one or more imagers (not shown), a microphone 440, one or more cameras 442, 444, or 446, and other audio and image capture techniques. The image data can include video data. The video data and the audio data can include cognitive state data, where the cognitive state data can include facial data, voice data, physiological data, and the like. The occupant can be a driver 420 of the vehicle 410, a passenger 422 within the vehicle, a custodial driver of the vehicle (not shown), and so on.

The imaging devices, which can be used to obtain images including upper torso data from the occupants of the vehicle 410, can be positioned to capture the upper torso of the vehicle operator, the upper torso of a vehicle passenger, multiple views of the upper torsos of occupants of the vehicle, and so on. The cameras or imaging devices that can be used to obtain images including facial data from the occupants of the vehicle 410 can be positioned to capture the face of the vehicle operator, the face of a vehicle passenger, multiple views of the faces of occupants of the vehicle, and so on. The cameras can be located near a rear-view mirror 414 such as camera 442, can be positioned near or on a dashboard 416 such as camera 444, can be positioned within the dashboard such as camera 446, and so on. The microphone or audio capture device 440 can be positioned within the vehicle such that voice data, speech data, non-speech vocalizations, and so on, can be easily collected with minimal background noise. In embodiments, additional cameras, imaging devices, microphones, audio capture devices, and so on, can be located throughout the vehicle. In further embodiments, each occupant of the vehicle could have multiple cameras, microphones, etc., positioned to capture video data and audio data from that occupant.

The interior of a vehicle 410 can be a standard vehicle, an autonomous vehicle, a semiautonomous vehicle, and so on. The vehicle can be a sedan or other automobile, a van, a sport utility vehicle (SUV), a truck, a bus, a special purpose vehicle, and the like. The interior of the vehicle 410 can include standard controls such as a steering wheel 436, a throttle control (not shown), a brake 434, and so on. The interior of the vehicle can include other controls 432 such as controls for seats, mirrors, climate systems, audio systems, etc. The controls 432 of the vehicle 410 can be controlled by a controller 430. The controller 430 can control the vehicle 410 in various manners such as autonomously, semiautonomously, assertively to a vehicle occupant 420 or 422, etc. In embodiments, the controller provides vehicle control or manipulation techniques, assistance, etc. The controller 430 can receive instructions via an antenna 412 or using other wireless techniques. The controller 430 can be preprogrammed to cause the vehicle to follow a specific route. The specific route that the vehicle is programmed to follow can be based on the cognitive state of the vehicle occupant. The specific route can be chosen based on lowest stress, least traffic, most scenic view, shortest route, and so on.

Figure 5:
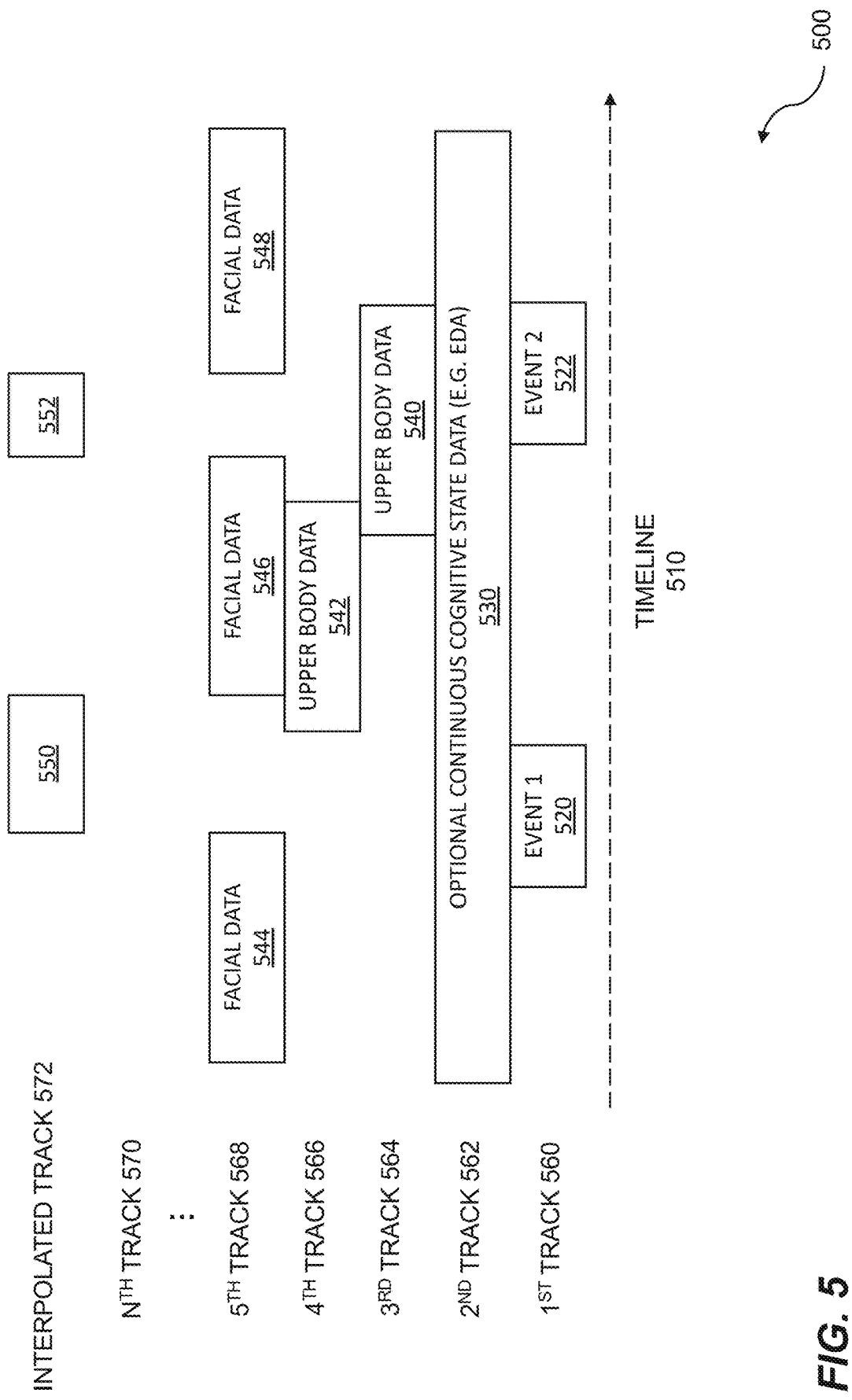
FIG. 5 is a timeline with information tracks relating to cognitive states.

FIG. 5 is a timeline with information tracks 500 relating to cognitive states. A timeline can show one or more cognitive states that can be experienced by a vehicle occupant. The vehicle occupant can be an operator of the vehicle, a passenger of the vehicle, a custodial driver of the vehicle, and so on. The timeline can be based on image analysis for human perception artificial intelligence. Images of a vehicle interior are collected, and an occupant within the vehicle interior is detected based on the images. Detection of the occupant is based on identifying an upper torso of the occupant or other facial or facial landmark identification of the occupant. A location for the occupant within the vehicle interior is determined. A human perception metric for the vehicle occupant is determined based on the images. The human perception metric is promoted to a using application.

The timeline 510 with information tracks 500 relates to various cognitive states. A first track 560 shows events that, in embodiments, are related to use of a computer by the individual. A first event 520 can indicate an action that the individual took (such as launching an application); an action initiated by the computer (such as the presentation of a dialog box); an external event (such as a new global positioning system (GPS) coordinate); or another event such as receiving an email, a phone call, a text message, or any other type of event. In some embodiments, a photograph can be used to document an event or simply to save contextual information in the first track 560. A second event 522 can indicate another action or event in a similar manner. Such events can be used to provide contextual information and can also include information such as copies of emails, text messages, phone logs, file names, or other information that can prove useful in understanding the context of a user's actions. Thus, in embodiments, contextual information is based on one or more of a photograph, an email, a text message, a phone log, or GPS information.

A second track 562 can include continuously collected cognitive state data such as electrodermal activity data 530. A third track 564 can include upper body data 540. The upper body data, such as upper torso data, can be collected intermittently when the individual is looking toward a camera. The upper body data 540 can include one or more still photographs, videos, or infrared images which can be collected when the user looks in the direction of the camera. A fourth track 566 also can include upper body data that is collected either intermittently or continuously by a second imaging device. The upper body data 542 can include one or more still photographs, videos, infrared images, or abstracted caricatures which can be collected when the user looks in the direction of that camera. A fifth track 568 can include facial data that is collected from a third camera, such as the webcam. In the example shown, the fifth track 568 includes first facial data 544, second facial data 546, and third facial data 548, which can be any type of facial data including data that can be used for determining cognitive state information. Any number of samples of facial data can be collected in any track. The cognitive state data from the various tracks can be collected simultaneously, collected on one track exclusive of other tracks, collected where cognitive state data overlaps between the tracks, and so on. When cognitive state data from multiple tracks overlap, one track's data can take precedence or the data from the multiple tracks can be combined.

Additional tracks, through the $n^{th}$ track 570, of cognitive state data of any type can be collected. The additional tracks 570 can be collected on a continuous or on an intermittent basis. The intermittent basis can be either occasional or periodic. Analysis can further comprise interpolating cognitive state data when the cognitive state data collected is intermittent, and/or imputing additional cognitive state data where the cognitive state data is missing. One or more interpolated tracks 572 can be included and can be associated with cognitive state data that is collected on an intermittent basis, such as the facial data of the fifth track 568. Interpolated data 550 and further interpolated data 552 can contain interpolations of the facial data of the fifth track 568 for the time periods where no facial data was collected in that track. Other embodiments interpolate data for periods wherein no track includes facial data. In other embodiments, analysis includes interpolating cognitive state analysis when the cognitive state data collected is intermittent.

The cognitive state data, such as the continuous cognitive state data 530 and/or any of the collected upper body data 540 and 542, and/or facial data 544, 546, and 548, can be tagged. The tags can include metadata related to the cognitive state data, including, but not limited to, the device that collected the cognitive state data; the individual from whom the cognitive state data was collected; the task being performed by the individual; the media being viewed by the individual; and the location, environ-cognitive conditions, time, date, or any other contextual information. The tags can be used to locate pertinent cognitive state data; for example, the tags can be used to retrieve the cognitive state data from a database. The tags can be included with the cognitive state data that is sent over the internet to cloud or web-based storage and/or services. As such, the tags can be used locally on the machine where the cognitive state data was collected and/or remotely on a remote server or a cloud/web service.

Other tags can be related to the cognitive state data, which is data related to, attached to, indicative of, including, containing, etc., the cognitive state. Further embodiments can include tagging the cognitive state data with sensor data. The sensor data can be obtained from the vehicle occupant along with the video data or the audio data, instead of the video data or the audio data, etc. In embodiments, the sensor data can include one or more of vehicle temperature, outside temperature, time of day, level of daylight, weather conditions, headlight activation, windshield wiper activation, entertainment center selection, or entertainment center volume. Other sensor data can include physiological data related to one or more occupants of the vehicle. The physiological data can include heart rate, heart rate variability, electrodermal activity, acceleration, and the like. The tags can also be related to the cognitive state that can be determined by image-based analysis of the video, audio, or physiological data, or other techniques. In embodiments, the tags that can be applied can be based on one or more of drowsiness, fatigue, distraction, impairment, sadness, stress, happiness, anger, frustration, confusion, disappointment, hesitation, cognitive overload, focusing, engagement, attention, boredom, exploration, confidence, trust, delight, disgust, skepticism, doubt, satisfaction, excitement, laughter, calmness, curiosity, humor, depression, envy, sympathy, embarrassment, poignancy, or mirth.

Figure 6:
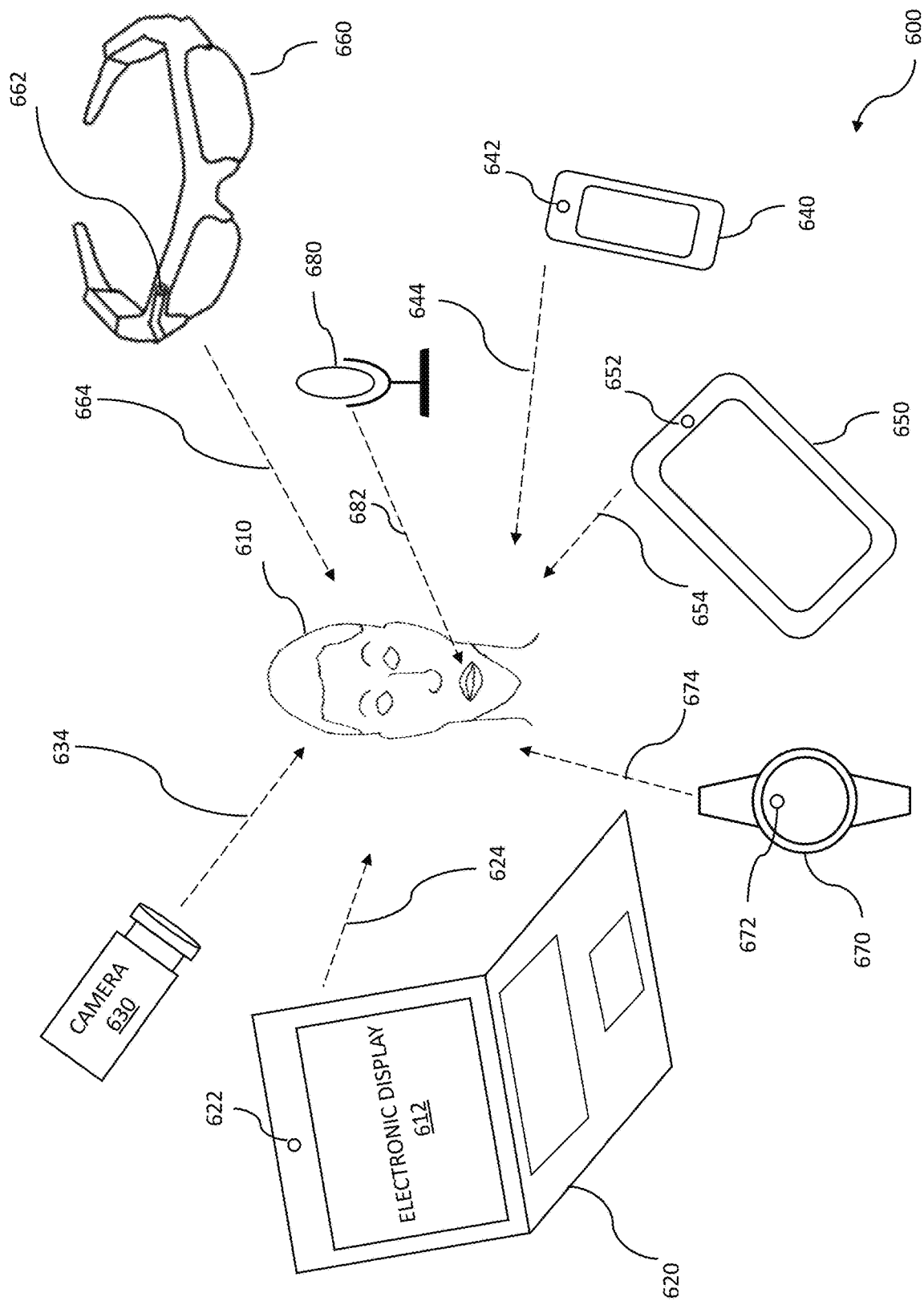
FIG. 6 shows example image and audio collection including multiple mobile devices.

FIG. 6 shows example image and audio collection including multiple mobile devices. Imaging, which can include image data, cognitive state data, audio data, and physiological data, can be collected using multiple mobile devices. The image data can be applied to vehicular in-cabin facial tracking using machine learning. In-cabin sensor data of a vehicle interior is collected. The in-cabin sensor data includes images of the vehicle interior. A set of seating locations for the vehicle interior is determined. The set is based on the images. The set of seating locations is scanned for performing facial detection for each of the seating locations using a facial detection model. A view of a detected face is manipulated. The manipulation is based on a geometry of the vehicle interior. Cognitive state data of the detected face is analyzed. The cognitive state data analysis is based on additional images of the detected face. The cognitive state data analysis uses the view that was manipulated. In the diagram 600, the multiple mobile devices can be used separately or in combination to collect video data, audio data, physiological data, or some or all of video data, audio data, and physiological data, on a user 610. While one person is shown, the images, video data, audio data, or physiological data can be collected on multiple people. A user 610 can be observed as she or he is performing a task, experiencing an event, viewing a media presentation, and so on. The user 610 can be shown one or more media presentations, political presentations, social media, or another form of displayed media. The one or more media presentations can be shown to a plurality of people. The media presentations can be displayed on an electronic display 612 or another display. The data collected on the user 610 or on a plurality of users can be in the form of one or more videos, video frames, and still images; one or more audio channels, etc. The plurality of video data and audio data can be of people who are experiencing different situations. Some example situations can include the user or plurality of users being exposed to TV programs, movies, video clips, social media, and other such media. The situations could also include exposure to media such as advertisements, political messages, news programs, and so on.

As noted before, video data and audio data can be collected on one or more users in substantially identical or different situations while viewing either a single media presentation or a plurality of presentations. The data collected on the user 610 can be analyzed and viewed for a variety of purposes including expression analysis, cognitive state analysis, mental state analysis, emotional state analysis, and so on. The electronic display 612 can be on a laptop computer 620 as shown, a tablet computer 650, a cell phone 640, a television, a mobile monitor, or any other type of electronic device. In one embodiment, video data including expression data is collected on a mobile device such as a cell phone 640, a tablet computer 650, a laptop computer 620, or a watch 670. Similarly, the audio data including speech data and non-speech vocalizations can be collected on one or more of the mobile devices. Thus, the multiple sources can include at least one mobile device, such as a phone 640 or a tablet 650, or a wearable device such as a watch 670 or glasses 660. A mobile device can include a front-side camera and/or a back-side camera that can be used to collect expression data. A mobile device can include a microphone, audio transducer, or other audio capture apparatus that can be used to capture the speech and non-speech vocalizations. Sources of expression data can include a webcam 622, a phone camera 642, a tablet camera 652, a wearable camera 662, and a mobile camera 630. A wearable camera can comprise various camera devices, such as a watch camera 672. Sources of audio data 682 can include a microphone 680.

As the user 610 is monitored, the user might move due to the nature of the task, boredom, discomfort, distractions, or for another reason. As the user moves, the camera with a view of the user's face can be changed. Thus, as an example, if the user is looking in a first direction, the line of sight 624 from the webcam 622 is able to observe the user's face, but if the user is looking in a second direction, the line of sight 634 from the mobile camera 630 is able to observe the user's face. Furthermore, in other embodiments, if the user is looking in a third direction, the line of sight 644 from the phone camera 642 is able to observe the user's face, and if the user is looking in a fourth direction, the line of sight 654 from the tablet camera 652 is able to observe the user's face. If the user is looking in a fifth direction, the line of sight 664 from the wearable camera 662, which can be a device such as the glasses 660 shown and can be worn by another user or an observer, is able to observe the user's face. If the user is looking in a sixth direction, the line of sight 674 from the wearable watch-type device 670, with a camera 672 included on the device, is able to observe the user's face. In other embodiments, the wearable device is another device, such as an earpiece with a camera, a helmet or hat with a camera, a clip-on camera attached to clothing, or any other type of wearable device with a camera or other sensor for collecting expression data. The user 610 can also use a wearable device including a camera for gathering contextual information and/or collecting expression data on other users. Because the user 610 can move her or his head, the facial data can be collected intermittently when she or he is looking in a direction of a camera. In some cases, multiple people can be included in the view from one or more cameras, and some embodiments include filtering out faces of one or more other people to determine whether the user 610 is looking toward a camera. All or some of the expression data can be continuously or sporadically available from the various devices and other devices.

The captured video data can include facial expressions and can be analyzed on a computing device such as the video capture device or on another separate device. The analysis can take place on one of the mobile devices discussed above, on a local server, on a remote server, and so on. In embodiments, some of the analysis takes place on the mobile device, while other analysis takes place on a server device. The analysis of the video data can include the use of a classifier. The video data can be captured using one of the mobile devices discussed above and sent to a server or another computing device for analysis. However, the captured video data including expressions can also be analyzed on the device which performed the capturing. The analysis can be performed on a mobile device where the videos were obtained with the mobile device and wherein the mobile device includes one or more of a laptop computer, a tablet, a PDA, a smartphone, a wearable device, and so on. In another embodiment, the analyzing comprises using a classifier on a server or another computing device other than the capturing device.

Figure 7:
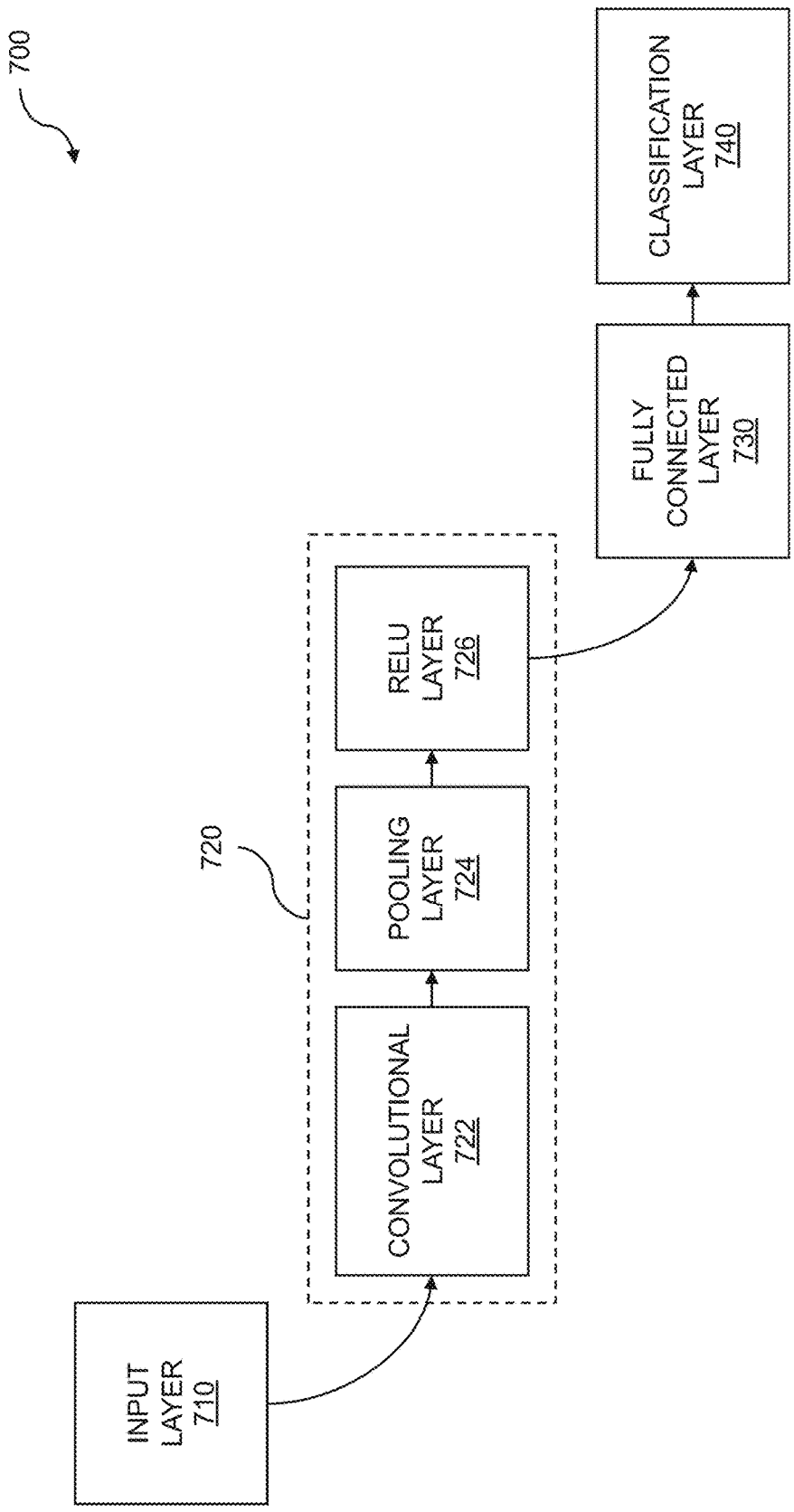
FIG. 7 is an example showing a convolutional neural network (CNN).

FIG. 7 is an example showing a convolutional neural network (CNN). A convolutional neural network such as network 700 can be used for various applications such as deep learning, where the deep learning can be applied to vehicular in-cabin facial tracking using machine learning. In-cabin sensor data of a vehicle interior is collected. The in-cabin sensor data includes images of the vehicle interior. A set of seating locations for the vehicle interior is determined. The set is based on the images. The set of seating locations is scanned for performing facial detection for each of the seating locations using a facial detection model. A view of a detected face is manipulated. The manipulation is based on a geometry of the vehicle interior. Cognitive state data of the detected face is analyzed. The cognitive state data analysis is based on additional images of the detected face. The cognitive state data analysis uses the view that was manipulated. The convolutional neural network can be applied to analysis tasks such as image analysis, cognitive state analysis, mental state analysis, mood analysis, emotional state analysis, and so on. The CNN can be applied to various tasks such as autonomous vehicle or semiautonomous vehicle manipulation, vehicle content recommendation, and the like. When the images and other data collected includes cognitive state data, the cognitive state data can include mental processes, where the mental processes can include attention, creativity, memory, perception, problem solving, thinking, use of language, or the like.

Analysis, including cognitive analysis, is a very complex task. Understanding and evaluating moods, emotions, mental states, or cognitive states, requires a nuanced evaluation of facial expressions or other cues generated by people. Cognitive state analysis is important in many areas such as research, psychology, business, intelligence, law enforcement, and so on. The understanding of cognitive states can be useful for a variety of business purposes, such as improving marketing analysis, assessing the effectiveness of customer service interactions and retail experiences, and evaluating the consumption of content such as movies and videos. Identifying points of frustration in a customer transaction can allow a company to address the causes of the frustration. By streamlining processes, key performance areas such as customer satisfaction and customer transaction throughput can be improved, resulting in increased sales and revenues. In a content scenario, producing compelling content that achieves the desired effect (e.g. fear, shock, laughter, etc.) can result in increased ticket sales and/or increased advertising revenue. If a movie studio is producing a horror movie, it is desirable to know if the scary scenes in the movie are achieving the desired effect. By conducting tests in sample audiences, and analyzing faces in the audience, a computer-implemented method and system can process thousands of faces to assess the cognitive state at the time of the scary scenes. In many ways, such an analysis can be more effective than surveys that ask audience members questions, since audience members may consciously or subconsciously change answers based on peer pressure or other factors. However, spontaneous facial expressions can be more difficult to conceal. Thus, by analyzing facial expressions en masse in real time, important information regarding the general cognitive state of the audience can be obtained.

Analysis of facial expressions is also a complex task. Image data, where the image data can include facial data, can be analyzed to identify a range of facial expressions. The facial expressions can include a smile, frown, smirk, and so on. The image data and facial data can be processed to identify the facial expressions. The processing can include analysis of expression data, action units, gestures, mental states, cognitive states, physiological data, and so on. Facial data as contained in the raw video data can include information on one or more of action units, head gestures, smiles, brow furrows, squints, lowered eyebrows, raised eyebrows, attention, and the like. The action units can be used to identify smiles, frowns, and other facial indicators of expressions. Gestures can also be identified, and can include a head tilt to the side, a forward lean, a smile, a frown, as well as many other gestures. Other types of data including physiological data can be collected, where the physiological data can be obtained using a camera or other image capture device, without contacting the person or persons. Respiration, heart rate, heart rate variability, perspiration, temperature, and other physiological indicators of cognitive state can be determined by analyzing the images and video data.

Deep learning is a branch of machine learning which seeks to imitate in software the activity which takes place in layers of neurons in the neocortex of the human brain. This imitative activity can enable software to "learn" to recognize and identify patterns in data, where the data can include digital forms of images, sounds, and so on. The deep learning software is used to simulate the large array of neurons of the neocortex. This simulated neocortex, or artificial neural network, can be implemented using mathematical formulas that are evaluated on processors. With the ever-increasing capabilities of the processors, increasing numbers of layers of the artificial neural network can be processed.

Deep learning applications include processing of image data, audio data, and so on. Image data applications include image recognition, facial recognition, etc. Image data applications can include differentiating dogs from cats, identifying different human faces, and the like. The image data applications can include identifying cognitive states, moods, mental states, emotional states, and so on, from the facial expressions of the faces that are identified. Audio data applications can include analyzing audio such as ambient room sounds, physiological sounds such as breathing or coughing, noises made by an individual such as tapping and drumming, voices, and so on. The voice data applications can include analyzing a voice for timbre, prosody, vocal register, vocal resonance, pitch, loudness, speech rate, or language content. The voice data analysis can be used to determine one or more cognitive states, moods, mental states, emotional states, etc.

The artificial neural network, such as a convolutional neural network which forms the basis for deep learning, is based on layers. The layers can include an input layer, a convolutional layer, a fully connected layer, a classification layer, and so on. The input layer can receive input data such as image data, where the image data can include a variety of formats including pixel formats. The input layer can then perform processing tasks such as identifying boundaries of the face, identifying landmarks of the face, extracting features of the face, and/or rotating a face within the plurality of images. The convolutional layer can represent an artificial neural network such as a convolutional neural network. A convolutional neural network can contain a plurality of hidden layers within it. A convolutional layer can reduce the amount of data feeding into a fully connected layer. The fully connected layer processes each pixel/data point from the convolutional layer. A last layer within the multiple layers can provide output indicative of cognitive state. The last layer of the convolutional neural network can be the final classification layer. The output of the final classification layer can be indicative of the cognitive states of faces within the images that are provided to the input layer.

Deep networks including deep convolutional neural networks can be used for facial expression parsing. A first layer of the deep network includes multiple nodes, where each node represents a neuron within a neural network. The first layer can receive data from an input layer. The output of the first layer can feed to a second layer, where the latter layer also includes multiple nodes. A weight can be used to adjust the output of the first layer which is being input to the second layer. Some layers in the convolutional neural network can be hidden layers. The output of the second layer can feed to a third layer. The third layer can also include multiple nodes. A weight can adjust the output of the second layer which is being input to the third layer. The third layer may be a hidden layer. Outputs of a given layer can be fed to the next layer. Weights adjust the output of one layer as it is fed to the next layer. When the final layer is reached, the output of the final layer can be a facial expression, a cognitive state, a mental state, a characteristic of a voice, and so on. The facial expression can be identified using a hidden layer from the one or more hidden layers. The weights can be provided on inputs to the multiple layers to emphasize certain facial features within the face. The convolutional neural network can be trained to identify facial expressions, voice characteristics, etc. The training can include assigning weights to inputs on one or more layers within the multilayered analysis engine. One or more of the weights can be adjusted or updated during training. The assigning weights can be accomplished during a feed-forward pass through the multilayered neural network. In a feed-forward arrangement, the information moves forward from the input nodes, through the hidden nodes, and on to the output nodes. Additionally, the weights can be updated during a backpropagation process through the multilayered analysis engine.

Returning to the figure, FIG. 7 is an example showing a convolutional neural network 700. The convolutional neural network can be used for deep learning, where the deep learning can be applied to image analysis for human perception artificial intelligence. The deep learning system can be accomplished using a variety of networks. In embodiments, the deep learning can be performed using a convolutional neural network. Other types of networks or neural networks can also be used. In other embodiments, the deep learning can be performed using a recurrent neural network. The deep learning can accomplish upper torso identification, facial recognition, analysis tasks, etc. The network includes an input layer 710. The input layer 710 receives image data. The image data can be input in a variety of formats, such as JPEG, TIFF, BMP, and GIF. Compressed image formats can be decompressed into arrays of pixels, wherein each pixel can include an RGB tuple. The input layer 710 can then perform processing such as identifying boundaries of the face, identifying landmarks of the face, extracting features of the face, and/or rotating a face within the plurality of images.

The network includes a collection of intermediate layers 720. The multilayered analysis engine can include a convolutional neural network. Thus, the intermediate layers can include a convolutional layer 722. The convolutional layer 722 can include multiple sublayers, including hidden layers within it. The output of the convolutional layer 722 feeds into a pooling layer 724. The pooling layer 724 performs a data reduction, which makes the overall computation more efficient. Thus, the pooling layer reduces the spatial size of the image representation to reduce the number of parameters and computation in the network. In some embodiments, the pooling layer is implemented using filters of size 2×2, applied with a stride of two samples for every depth slice along both width and height, resulting in a reduction of 75-percent of the downstream node activations. The multilayered analysis engine can further include a max pooling layer 724. Thus, in embodiments, the pooling layer is a max pooling layer, in which the output of the filters is based on a maximum of the inputs. For example, with a 2×2 filter, the output is based on a maximum value from the four input values. In other embodiments, the pooling layer is an average pooling layer or L2-norm pooling layer. Various other pooling schemes are possible.

The intermediate layers can include a Rectified Linear Units (RELU) layer 726. The output of the pooling layer 724 can be input to the RELU layer 726. In embodiments, the RELU layer implements an activation function such as $f(x)=\max(0,x)$, thus providing an activation with a threshold at zero. In some embodiments, the RELU layer 726 is a leaky RELU layer. In this case, instead of the activation function providing zero when x<0, a small negative slope is used, resulting in an activation function such as $f(x)=1(x<0)(\alpha x)+1(x>=0)(x)$. This can reduce the risk of "dying RELU" syndrome, where portions of the network can be "dead" with nodes/neurons that do not activate across the training dataset. The image analysis can comprise training a multilayered analysis engine using the plurality of images, wherein the multilayered analysis engine can comprise multiple layers that include one or more convolutional layers 722 and one or more hidden layers, and wherein the multilayered analysis engine can be used for emotional analysis.

The example 700 includes a fully connected layer 730. The fully connected layer 730 processes each pixel/data point from the output of the collection of intermediate layers 720. The fully connected layer 730 takes all neurons in the previous layer and connects them to every single neuron it has. The output of the fully connected layer 730 provides input to a classification layer 740. The output of the classification layer 740 provides a facial expression and/or cognitive state as its output. Thus, a multilayered analysis engine such as the one depicted in FIG. 7 processes image data using weights, models the way the human visual cortex performs object recognition and learning, and effectively analyzes image data to infer facial expressions and cognitive states.

Machine learning for generating parameters, analyzing data such as facial data and audio data, and so on, can be based on a variety of computational techniques. Generally, machine learning can be used for constructing algorithms and models. The constructed algorithms, when executed, can be used to make a range of predictions relating to data. The predictions can include whether an object in an image is a face, a box, or a puppy, whether a voice is female, male, or robotic, whether a message is legitimate email or a "spam" message, and so on. The data can include unstructured data and can be of large quantity. The algorithms that can be generated by machine learning techniques are particularly useful to data analysis because the instructions that comprise the data analysis technique do not need to be static. Instead, the machine learning algorithm or model, generated by the machine learning technique, can adapt. Adaptation of the learning algorithm can be based on a range of criteria such as success rate, failure rate, and so on. A successful algorithm is one that can adapt—or learn—as more data is presented to the algorithm. Initially, an algorithm can be "trained" by presenting it with a set of known data (supervised learning). Another approach, called unsupervised learning, can be used to identify trends and patterns within data. Unsupervised learning is not trained using known data prior to data analysis.

Reinforced learning is an approach to machine learning that is inspired by behaviorist psychology. The underlying premise of reinforced learning (also called reinforcement learning) is that software agents can take actions in an environment. The actions that are taken by the agents should maximize a goal such as a "cumulative reward". A software agent is a computer program that acts on behalf of a user or other program. The software agent is implied to have the authority to act on behalf of the user or program. The actions taken are decided by action selection to determine what to do next. In machine learning, the environment in which the agents act can be formulated as a Markov decision process (MDP). The MDPs provide a mathematical framework for modeling of decision making in environments where the outcomes can be partly random (stochastic) and partly under the control of the decision maker. Dynamic programming techniques can be used for reinforced learning algorithms. Reinforced learning is different from supervised learning in that correct input/output pairs are not presented, and suboptimal actions are not explicitly corrected. Rather, on-line or computational performance is the focus. On-line performance includes finding a balance between exploration of new (uncharted) territory or spaces and exploitation of current knowledge. That is, there is a tradeoff between exploration and exploitation.

Machine learning based on reinforced learning adjusts or learns based on learning an action, a combination of actions, and so on. An outcome results from taking an action. Thus, the learning model, algorithm, etc., learns from the outcomes that result from taking the action or combination of actions. The reinforced learning can include identifying positive outcomes, where the positive outcomes are used to adjust the learning models, algorithms, and so on. A positive outcome can be dependent on a context. When the outcome is based on a mood, emotional state, mental state, cognitive state, etc., of an individual, then a positive mood, emotion, mental state, or cognitive state can be used to adjust the model and algorithm. Positive outcomes can include the person being more engaged, where engagement is based on affect, the person spending more time playing an online game or navigating a webpage, the person converting by buying a product or service, and so on. The reinforced learning can be based on exploring a solution space and adapting the model, algorithm, etc., which stem from outcomes of the exploration. When positive outcomes are encountered, the positive outcomes can be reinforced by changing weighting values within the model, algorithm, etc. Positive outcomes may result in increased weighting values. Negative outcomes can also be considered, where weighting values may be reduced or otherwise adjusted.

Figure 8:
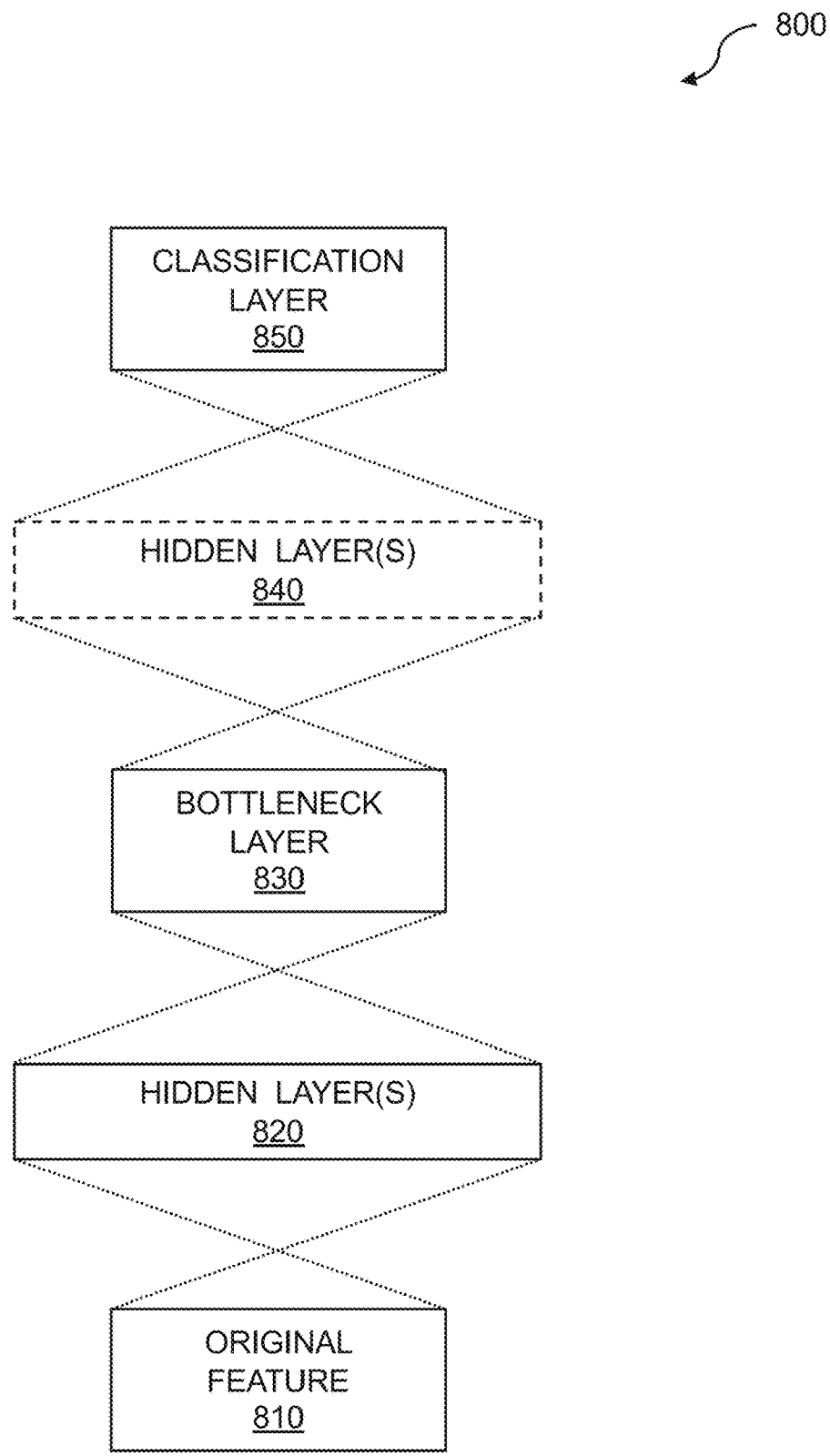
FIG. 8 illustrates a bottleneck layer within a deep learning environment.

FIG. 8 illustrates a bottleneck layer within a deep learning environment. A plurality of layers in a deep neural network (DNN) can include a bottleneck layer. The bottleneck layer can be used for vehicular in-cabin facial tracking using machine learning. A deep neural network can apply classifiers such as upper torso classifiers, image classifiers, facial classifiers, audio classifiers, speech classifiers, physiological classifiers, and so on. The classifiers can be learned by analyzing one or more human perception metrics. In-cabin sensor data of a vehicle interior is collected. The in-cabin sensor data includes images of the vehicle interior. A set of seating locations for the vehicle interior is determined. The set is based on the images. The set of seating locations is scanned for performing facial detection for each of the seating locations using a facial detection model. A view of a detected face is manipulated. The manipulation is based on a geometry of the vehicle interior. Cognitive state data of the detected face is analyzed. The cognitive state data analysis is based on additional images of the detected face. The cognitive state data analysis uses the view that was manipulated.

Layers of a deep neural network can include a bottleneck layer 800. A bottleneck layer can be used for a variety of applications such as identifying an upper torso, facial recognition, voice recognition, emotional state recognition, and so on. The deep neural network in which the bottleneck layer is located can include a plurality of layers. The plurality of layers can include an original feature layer 810. A feature such as an image feature can include points, edges, objects, boundaries between and among regions, properties, and so on. The deep neural network can include one or more hidden layers 820. The one or more hidden layers can include nodes, where the nodes can include nonlinear activation functions and other techniques. The bottleneck layer can be a layer that learns translation vectors to transform a neutral face to an emotional or expressive face. In some embodiments, the translation vectors can transform a neutral sounding voice to an emotional or expressive voice. Specifically, activations of the bottleneck layer determine how the transformation occurs. A single bottleneck layer can be trained to transform a neutral face or voice to a different emotional face or voice. In some cases, an individual bottleneck layer can be trained for a transformation pair. At runtime, once the user's emotion has been identified and an appropriate response to it can be determined (mirrored or complementary), the trained bottleneck layer can be used to perform the needed transformation.

The deep neural network can include a bottleneck layer 830. The bottleneck layer can include a fewer number of nodes than the one or more preceding hidden layers. The bottleneck layer can create a constriction in the deep neural network or other network. The bottleneck layer can force information that is pertinent to a classification, for example, into a low dimensional representation. The bottleneck features can be extracted using an unsupervised technique. In other embodiments, the bottleneck features can be extracted using a supervised technique. The supervised technique can include training the deep neural network with a known dataset. The features can be extracted from an autoencoder such as a variational autoencoder, a generative autoencoder, and so on. The deep neural network can include hidden layers 840. The number of the hidden layers can include zero hidden layers, one hidden layer, a plurality of hidden layers, and so on. The hidden layers following the bottleneck layer can include more nodes than the bottleneck layer. The deep neural network can include a classification layer 850. The classification layer can be used to identify the points, edges, objects, boundaries, and so on, described above. The classification layer can be used to identify cognitive states, mental states, emotional states, moods, and the like. The output of the final classification layer can be indicative of the emotional states of faces within the images, where the images can be processed using the deep neural network.

Figure 9:
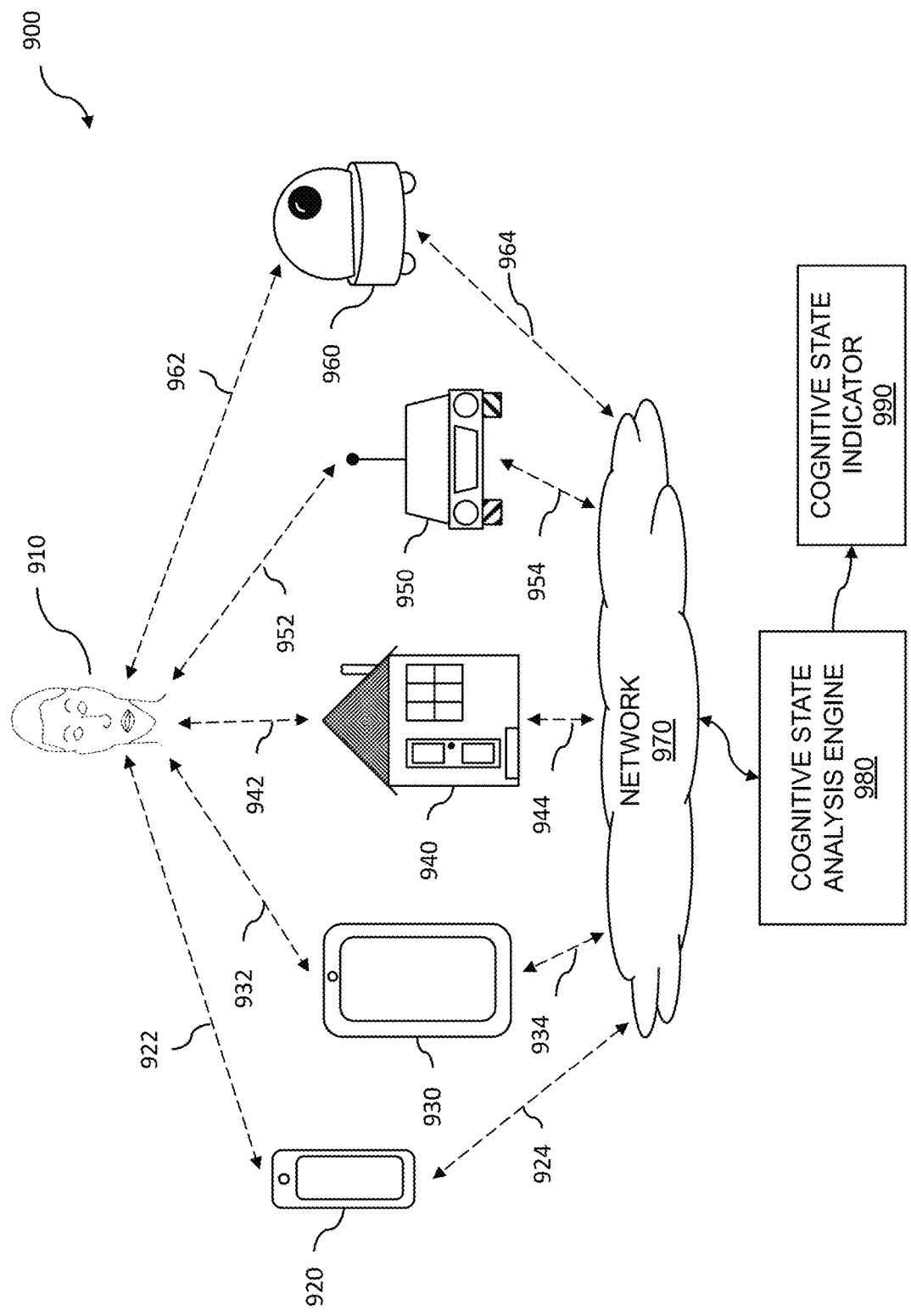
FIG. 9 shows data collection including devices and locations.

FIG. 9 shows data collection including devices and locations 900. Data, including images, video data, audio data and physio data, can be obtained for vehicular in-cabin facial tracking using machine learning. In-cabin sensor data of a vehicle interior is collected. The in-cabin sensor data includes images of the vehicle interior. A set of seating locations for the vehicle interior is determined. The set is based on the images. The set of seating locations is scanned for performing facial detection for each of the seating locations using a facial detection model. A view of a detected face is manipulated. The manipulation is based on a geometry of the vehicle interior. Cognitive state data of the detected face is analyzed. The cognitive state data analysis is based on additional images of the detected face. The cognitive state data analysis uses the view that was manipulated.

The multiple mobile devices, vehicles, and locations 900 can be used separately or in combination to collect images, video data, audio data, physio data, etc., on a user 910. The images can include video data, where the video data can include upper torso data. Other data such as audio data, physiological data, and so on, can be collected on the user. While one person is shown, the video data, or other data, can be collected on multiple people. A user 910 can be observed as she or he is performing a task, experiencing an event, viewing a media presentation, and so on. The user 910 can be shown one or more media presentations, political presentations, social media, or another form of displayed media. The one or more media presentations can be shown to a plurality of people. The media presentations can be displayed on an electronic display coupled to a client device. The data collected on the user 910 or on a plurality of users can be in the form of one or more videos, video frames, still images, etc. The plurality of videos can be of people who are experiencing different situations. Some example situations can include the user or plurality of users being exposed to TV programs, movies, video clips, social media, social sharing, and other such media. The situations could also include exposure to media such as advertisements, political messages, news programs, and so on. As noted before, video data can be collected on one or more users in substantially identical or different situations and viewing either a single media presentation or a plurality of presentations. The data collected on the user 910 can be analyzed and viewed for a variety of purposes including body position or body language analysis, expression analysis, mental state analysis, cognitive state analysis, and so on. The electronic display can be on a smartphone 920 as shown, a tablet computer 930, a personal digital assistant, a television, a mobile monitor, or any other type of electronic device. In one embodiment, expression data is collected on a mobile device such as a cell phone 920, a tablet computer 930, a laptop computer, or a watch. Thus, the multiple sources can include at least one mobile device, such as a phone 920 or a tablet 930, or a wearable device such as a watch or glasses (not shown). A mobile device can include a front-facing camera and/or a back-facing camera that can be used to collect expression data. Sources of expression data can include a webcam, a phone camera, a tablet camera, a wearable camera, and a mobile camera. A wearable camera can comprise various camera devices, such as a watch camera. In addition to using client devices for data collection from the user 910, data can be collected in a house 940 using a web camera or the like; in a vehicle 950 using a web camera, client device, etc.; by a social robot 960, and so on.

As the user 910 is monitored, the user 910 might move due to the nature of the task, boredom, discomfort, distractions, or for another reason. As the user moves, the camera with a view of the user's face can be changed. Thus, as an example, if the user 910 is looking in a first direction, the line of sight 922 from the smartphone 920 is able to observe the user's face, but if the user is looking in a second direction, the line of sight 932 from the tablet 930 is able to observe the user's face. Furthermore, in other embodiments, if the user is looking in a third direction, the line of sight 942 from a camera in the house 940 is able to observe the user's face, and if the user is looking in a fourth direction, the line of sight 952 from the camera in the vehicle 950 is able to observe the user's face. If the user is looking in a fifth direction, the line of sight 962 from the social robot 960 is able to observe the user's face. If the user is looking in a sixth direction, a line of sight from a wearable watch-type device, with a camera included on the device, is able to observe the user's face. In other embodiments, the wearable device is another device, such as an earpiece with a camera, a helmet or hat with a camera, a clip-on camera attached to clothing, or any other type of wearable device with a camera or other sensor for collecting expression data. The user 910 can also use a wearable device including a camera for gathering contextual information and/or collecting expression data on other users. Because the user 910 can move her or his head, the facial data can be collected intermittently when she or he is looking in a direction of a camera. In some cases, multiple people can be included in the view from one or more cameras, and some embodiments include filtering out faces of one or more other people to determine whether the user 910 is looking toward a camera. All or some of the expression data can be continuously or sporadically available from the various devices and other devices.

The captured video data can include cognitive content, such as facial expressions, etc., and can be transferred over a network 970. The network can include the Internet or other computer network. The smartphone 920 can share video using a link 924, the tablet 930 using a link 934, the house 940 using a link 944, the vehicle 950 using a link 954, and the social robot 960 using a link 964. The links 924, 934, 944, 954, and 964 can be wired, wireless, and hybrid links. The captured video data, including facial expressions, can be analyzed on a cognitive state analysis engine 980, on a computing device such as the video capture device, or on another separate device. The analysis could take place on one of the mobile devices discussed above, on a local server, on a remote server, and so on. In embodiments, some of the analysis takes place on the mobile device, while other analysis takes place on a server device. The analysis of the video data can include the use of a classifier. The video data can be captured using one of the mobile devices discussed above and sent to a server or another computing device for analysis. However, the captured video data including expressions can also be analyzed on the device which performed the capturing. The analysis can be performed on a mobile device where the videos were obtained with the mobile device and wherein the mobile device includes one or more of a laptop computer, a tablet, a PDA, a smartphone, a wearable device, and so on. In another embodiment, the analyzing comprises using a classifier on a server or another computing device different from the capture device. The analysis data from the cognitive state analysis engine can be processed by a cognitive state indicator 990. The cognitive state indicator 990 can indicate cognitive states, mental states, moods, emotions, etc. In embodiments, the cognitive state can include drowsiness, fatigue, distraction, impairment, sadness, stress, happiness, anger, frustration, confusion, disappointment, hesitation, cognitive overload, focusing, engagement, attention, boredom, exploration, confidence, trust, delight, disgust, skepticism, doubt, satisfaction, excitement, laughter, calmness, curiosity, humor, depression, envy, sympathy, embarrassment, poignancy, or mirth.

Figure 10:
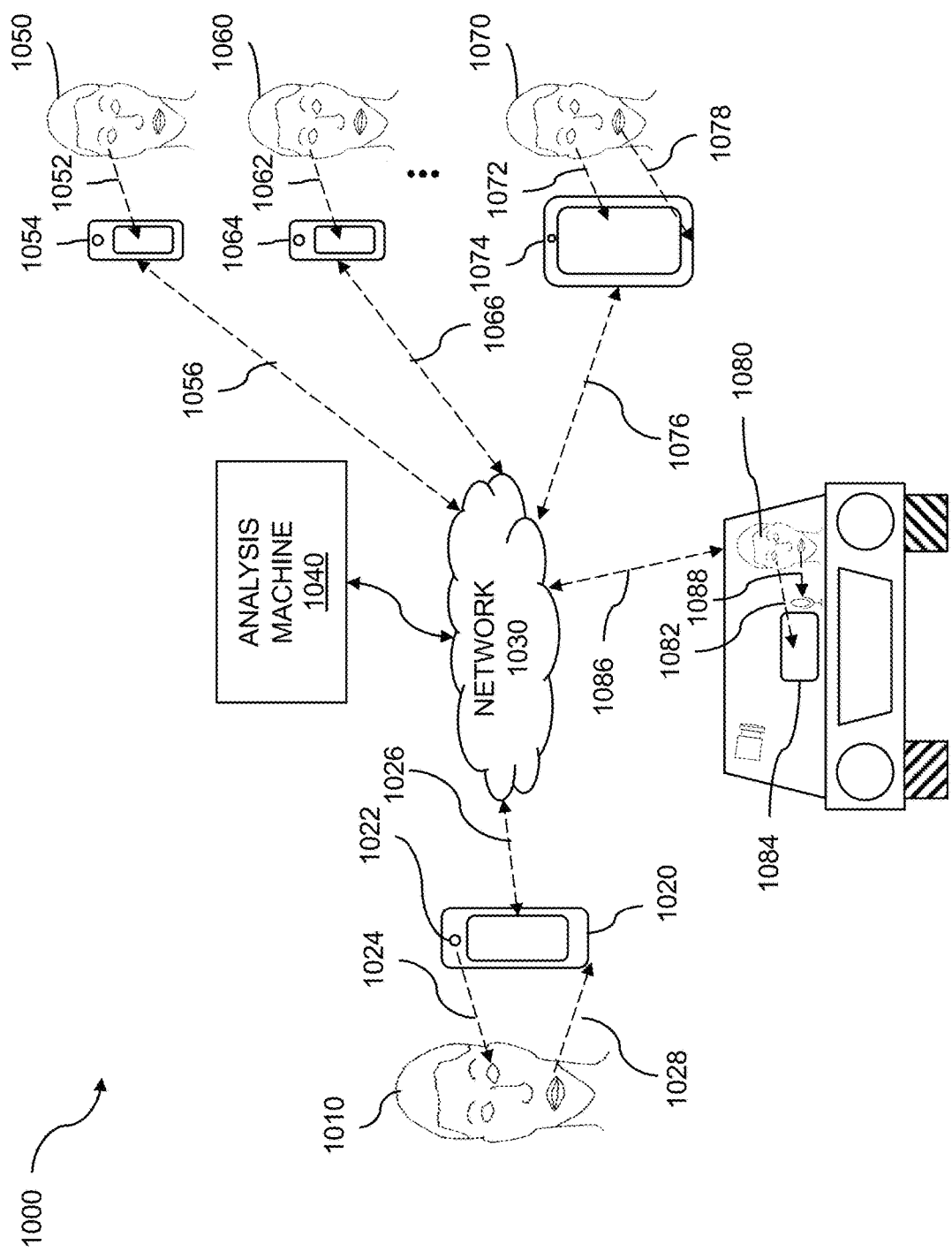
FIG. 10 illustrates an example of livestreaming of social video and audio.

FIG. 10 shows an example of livestreaming of social video and audio. The streaming of social video and social audio can be applied to vehicular in-cabin facial tracking using machine learning. The livestreaming can include human perception data, image data, upper torso data, speech data, audio data, etc. In-cabin sensor data of a vehicle interior is collected. The in-cabin sensor data includes images of the vehicle interior. A set of seating locations for the vehicle interior is determined. The set is based on the images. The set of seating locations is scanned for performing facial detection for each of the seating locations using a facial detection model. A view of a detected face is manipulated. The manipulation is based on a geometry of the vehicle interior. Cognitive state data of the detected face is analyzed. The cognitive state data analysis is based on additional images of the detected face. The cognitive state data analysis uses the view that was manipulated.

The livestreaming and image analysis 1000 can be facilitated by a video capture device, a local server, a remote server, a semiconductor-based logic, and so on. The streaming can be livestreaming and can include cognitive state analysis, cognitive state event signature analysis, etc. Livestreaming video is an example of one-to-many social media, where video can be sent over the Internet from one person to a plurality of people using a social media app and/or platform. Livestreaming is one of numerous popular techniques used by people who want to disseminate ideas, send information, provide entertainment, share experiences, and so on. Some of the livestreams, such as webcasts, online classes, sporting events, news, computer gaming, or video conferences can be scheduled, while others can be impromptu streams that are broadcast as needed or when desired. Examples of impromptu livestream videos can range from individuals simply wanting to share experiences with their social media followers, to live coverage of breaking news, emergencies, or natural disasters. The latter coverage is known as mobile journalism, or "mojo", and is becoming increasingly common. With this type of coverage, news reporters can use networked, portable electronic devices to provide mobile journalism content to a plurality of social media followers. Such reporters can be quickly and inexpensively deployed as the need or desire arises.

Several livestreaming social media apps and platforms can be used for transmitting video. One such video social media app is Meerkat™ which can link with a user's Twitter™ account. Meerkat™ enables a user to stream video using a handheld, networked electronic device coupled to video capabilities. Viewers of the livestream can comment on the stream using tweets that can be seen and responded to by the broadcaster. Another popular app is Periscope™ which can transmit a live recording from one user to his or her Periscope™ account and to other followers. The Periscope™ app can be executed on a mobile device. The user's Periscope™ followers can receive an alert whenever that user begins a video transmission. Another livestream video platform is Twitch™ which can be used for video streaming of video gaming and broadcasts of various competitions and events.

The example 1000 shows a user 1010 broadcasting a video livestream and an audio livestream to one or more people as shown by a first person 1050, a second person 1060, and a third person 1070. A portable, network-enabled, electronic device 1020 can be coupled to a front-side camera 1022. The portable electronic device 1020 can be a smartphone, a PDA, a tablet, a laptop computer, and so on. The camera 1022 coupled to the device 1020 can have a line-of-sight view 1024 to the user 1010 and can capture video of the user 1010. The portable electronic device 1020 can be coupled to a microphone (not shown). The microphone can capture voice data 1028 such as speech and non-speech vocalizations. In embodiments, non-speech vocalizations can include grunts, yelps, squeals, snoring, sighs, laughter, filled pauses, unfilled pauses, yawns, or the like. The captured video and audio can be sent to an analysis or recommendation engine 1040 using a network link 1026 to the network 1030. The network link can be a wireless link, a wired link, and so on. The recommendation engine 1040 can recommend to the user 1010 an app and/or platform that can be supported by the server and can be used to provide a video livestream, an audio livestream, or both a video livestream and an audio livestream to one or more followers of the user 1010.

In the example 1000, the user 1010 has four followers: a first person 1050, a second person 1060, a third person 1070, and a fourth person 1080. Each follower has a line-of-sight view to a video screen on a portable, networked electronic device. In other embodiments, one or more followers follow the user 1010 using any other networked electronic device, including a computer. In the example 1000, a first person 1050 has a line-of-sight view 1052 to the video screen of a device 1054; a second person 1060 has a line-of-sight view 1062 to the video screen of a device 1064, a third person 1070 has a line-of-sight view 1072 to the video screen of a device 1074, and a fourth person 1080 has a line-of-sight view 1082 to the video screen of a device 1084. The device 1074 can also capture audio data 1078 from the third person 1070, and the device 1084 can further capture audio data 1088 from the fourth person 1080. The portable electronic devices 1054, 1064, 1074, and 1084 can each be a smartphone, a PDA, a tablet, and so on. Each portable device can receive the video stream and the audio stream being broadcast by the user 1010 through the network 1030 using the app and/or platform that can be recommended by the recommendation engine 1040. The network can include the Internet, a computer network, a cellular network, and the like. The device 1054 can receive a video stream and the audio stream using the network link 1056, the device 1064 can receive a video stream and the audio stream using the network link 1066, the device 1074 can receive a video stream and the audio stream using the network link 1076, the device 1084 can receive a video stream and the audio stream using the network link 1086, and so on. The network link can be a wireless link, a wired link, a hybrid link, and the like. Depending on the app and/or platform that can be recommended by the analysis engine 1040, one or more followers, such as the followers shown 1050, 1060, 1070, and 1080, can reply to, comment on, or otherwise provide feedback to the user 1010 using their respective devices 1054, 1064, 1074, and 1084.

The human face provides a powerful communications medium through its ability to exhibit numerous expressions that can be captured and analyzed for a variety of purposes. In some cases, media producers are acutely interested in evaluating the effectiveness of message delivery by video media. Such video media includes advertisements, political messages, educational materials, television programs, movies, government service announcements, etc. Automated facial analysis can be performed on one or more video frames containing a face in order to detect facial action. Based on the facial action detected, a variety of parameters can be determined, including affect valence, spontaneous reactions, facial action units, and so on. The parameters that are determined can be used to infer or predict emotional, mental, and cognitive states. For example, determined valence can be used to describe the emotional reaction of a viewer to a video media presentation or another type of presentation. Positive valence provides evidence that a viewer is experiencing a favorable emotional response to the video media presentation, while negative valence provides evidence that a viewer is experiencing an unfavorable emotional response to the video media presentation. Other facial data analysis can include the determination of discrete emotional states of the viewer or viewers.

Facial data can be collected from a plurality of people using any of a variety of cameras. A camera can include a webcam, a video camera, a still camera, a thermal imager, a CCD device, a phone camera, a three-dimensional camera, a depth camera, a light field camera, multiple webcams used to show different views of a person, or any other type of image capture apparatus that can allow captured data to be used in an electronic system. In some embodiments, the person is permitted to "opt in" to the facial data collection. For example, the person can agree to the capture of facial data using a personal device such as a mobile device or another electronic device by selecting an opt-in choice. Opting in can then turn on the person's webcam-enabled device and can begin the capture of the person's facial data via a video feed from the webcam or other camera. The video data that is collected can include one or more persons experiencing an event. The one or more persons can be sharing a personal electronic device, or can each be using one or more devices for video capture. The videos that are collected can be collected using a web-based framework. The web-based framework can be used to display the video media presentation or event as well as to collect videos from multiple viewers who are online. That is, the collection of videos can be crowdsourced from those viewers who elected to opt in to the video data collection.

The videos captured from the various viewers who chose to opt in can be substantially different in terms of video quality, frame rate, etc. As a result, the facial video data can be scaled, rotated, and otherwise adjusted to improve consistency. Human factors further contribute to the capture of the facial video data. The facial data that is captured might or might not be relevant to the video media presentation being displayed. For example, the viewer might not be paying attention, might be fidgeting, might be distracted by an object or event near the viewer, or might be otherwise inattentive to the video media presentation. The behavior exhibited by the viewer can prove challenging to analyze due to viewer actions including eating, speaking to another person or persons, speaking on the phone, etc. The videos collected from the viewers might also include other artifacts that pose challenges during the analysis of the video data. The artifacts can include items such as eyeglasses (because of reflections), eye patches, jewelry, and clothing that occlude or obscure the viewer's face. Similarly, a viewer's hair or hair covering can present artifacts by obscuring the viewer's eyes and/or face.

The captured facial data can be analyzed using the facial action coding system (FACS). The FACS seeks to define groups or taxonomies of facial movements of the human face. The FACS encodes movements of individual muscles of the face, where the muscle movements often include slight, instantaneous changes in facial appearance. The FACS encoding is commonly performed by trained observers, but can also be performed on automated, computer-based systems. Analysis of the FACS encoding can be used to determine emotions of the persons whose facial data is captured in the videos. The FACS is used to encode a wide range of facial expressions that are anatomically possible for the human face. The FACS encodings include action units (AUs) and related temporal segments that are based on the captured facial expression. The AUs are open to higher order interpretation and decision-making. These AUs can be used to recognize emotions experienced by the person who is being observed. Emotion-related facial actions can be identified using the emotional facial action coding system (EMFACS) and the facial action coding system affect interpretation dictionary (FACSAID). For a given emotion, specific action units can be related to the emotion. For example, the emotion of anger can be related to AUs 4, 5, 7, and 23, while happiness can be related to AUs 6 and 12. Other mappings of emotions to AUs have also been previously associated. The coding of the AUs can include an intensity scoring that ranges from A (trace) to E (maximum). The AUs can be used for analyzing images to identify patterns indicative of a particular cognitive and/or emotional state. The AUs range in number from 0 (neutral face) to 98 (fast up-down look). The AUs include so-called main codes (inner brow raiser, lid tightener, etc.), head movement codes (head turn left, head up, etc.), eye movement codes (eyes turned left, eyes up, etc.), visibility codes (eyes not visible, entire face not visible, etc.), and gross behavior codes (sniff, swallow, etc.). Emotion scoring can be included where intensity is evaluated, and specific emotions, moods, mental states, or cognitive states can be identified.

The coding of faces identified in videos captured of people observing an event can be automated. The automated systems can detect facial AUs or discrete emotional states. The emotional states can include amusement, fear, anger, disgust, surprise, and sadness. The automated systems can be based on a probability estimate from one or more classifiers, where the probabilities can correlate with an intensity of an AU or an expression. The classifiers can be used to identify into which of a set of categories a given observation can be placed. In some cases, the classifiers can be used to determine a probability that a given AU or expression is present in a given frame of a video. The classifiers can be used as part of a supervised machine learning technique, where the machine learning technique can be trained using "known good" data. Once trained, the machine learning technique can proceed to classify new data that is captured.

The supervised machine learning models can be based on support vector machines (SVMs). An SVM can have an associated learning model that is used for data analysis and pattern analysis. For example, an SVM can be used to classify data that can be obtained from collected videos of people experiencing a media presentation. An SVM can be trained using "known good" data that is labeled as belonging to one of two categories (e.g. smile and no-smile). The SVM can build a model that assigns new data into one of the two categories. The SVM can construct one or more hyperplanes that can be used for classification. The hyperplane that has the largest distance from the nearest training point can be determined to have the best separation. The largest separation can improve the classification technique by increasing the probability that a given data point can be properly classified.

In another example, a histogram of oriented gradients (HoG) can be computed. The HoG can include feature descriptors and can be computed for one or more facial regions of interest. The regions of interest of the face can be located using facial landmark points, where the facial landmark points can include outer edges of nostrils, outer edges of the mouth, outer edges of eyes, etc. A HoG for a given region of interest can count occurrences of gradient orientation within a given section of a frame from a video, for example. The gradients can be intensity gradients and can be used to describe an appearance and a shape of a local object. The HoG descriptors can be determined by dividing an image into small, connected regions, also called cells. A histogram of gradient directions or edge orientations can be computed for pixels in the cell. Histograms can be contrast-normalized based on intensity across a portion of the image or the entire image, thus reducing any influence from differences in illumination or shadowing changes between and among video frames. The HoG can be computed on the image or on an adjusted version of the image, where the adjustment of the image can include scaling, rotation, etc. The image can be adjusted by flipping the image around a vertical line through the middle of a face in the image. The symmetry plane of the image can be determined from the tracker points and landmarks of the image.

In embodiments, an automated facial analysis system identifies five facial actions or action combinations in order to detect spontaneous facial expressions for media research purposes. Based on the facial expressions that are detected, a determination can be made with regard to the effectiveness of a given video media presentation, for example. The system can detect the presence of the AUs or the combination of AUs in videos collected from a plurality of people. The facial analysis technique can be trained using a web-based framework to crowdsource videos of people as they watch online video content. The video can be streamed at a fixed frame rate to a server. Human labelers can code for the presence or absence of facial actions including a symmetric smile, unilateral smile, asymmetric smile, and so on. The trained system can then be used to automatically code the facial data collected from a plurality of viewers experiencing video presentations (e.g. television programs).

Spontaneous asymmetric smiles can be detected in order to understand viewer experiences. Related literature indicates that as many asymmetric smiles occur on the right hemi face as do on the left hemi face, for spontaneous expressions. Detection can be treated as a binary classification problem, where images that contain a right asymmetric expression are used as positive (target class) samples and all other images as negative (non-target class) samples. Classifiers perform the classification, including classifiers such as support vector machines (SVM) and random forests. Random forests can include ensemble-learning methods that use multiple learning algorithms to obtain better predictive performance. Frame-by-frame detection can be performed to recognize the presence of an asymmetric expression in each frame of a video. Facial points can be detected, including the top of the mouth and the two outer eye corners. The face can be extracted, cropped, and warped into a pixel image of specific dimension (e.g. 96×96 pixels). In embodiments, the inter-ocular distance and vertical scale in the pixel image are fixed. Feature extraction can be performed using computer vision software such as OpenCV™. Feature extraction can be based on the use of HoGs. HoGs can include feature descriptors and can be used to count occurrences of gradient orientation in localized portions or regions of the image. Other techniques can be used for counting occurrences of gradient orientation, including edge orientation histograms, scale-invariant feature transformation descriptors, etc. The AU recognition tasks can also be performed using Local Binary Patterns (LBPs) and Local Gabor Binary Patterns (LGBPs). The HoG descriptor represents the face as a distribution of intensity gradients and edge directions and is robust in its ability to translate and scale. Differing patterns, including groupings of cells of various sizes and arranged in variously sized cell blocks, can be used. For example, 4×4 cell blocks of 8×8-pixel cells with an overlap of half of the block can be used. Histograms of channels can be used, including nine channels or bins evenly spread over 0-180 degrees. In this example, the HoG descriptor on a 96×96 image is 25 blocks×16 cells×9 bins=3600, the latter quantity representing the dimension. AU occurrences can be rendered. The videos can be grouped into demographic datasets based on nationality and/or other demographic parameters for further detailed analysis. This grouping and other analyses can be facilitated via semiconductor-based logic.

Figure 11:
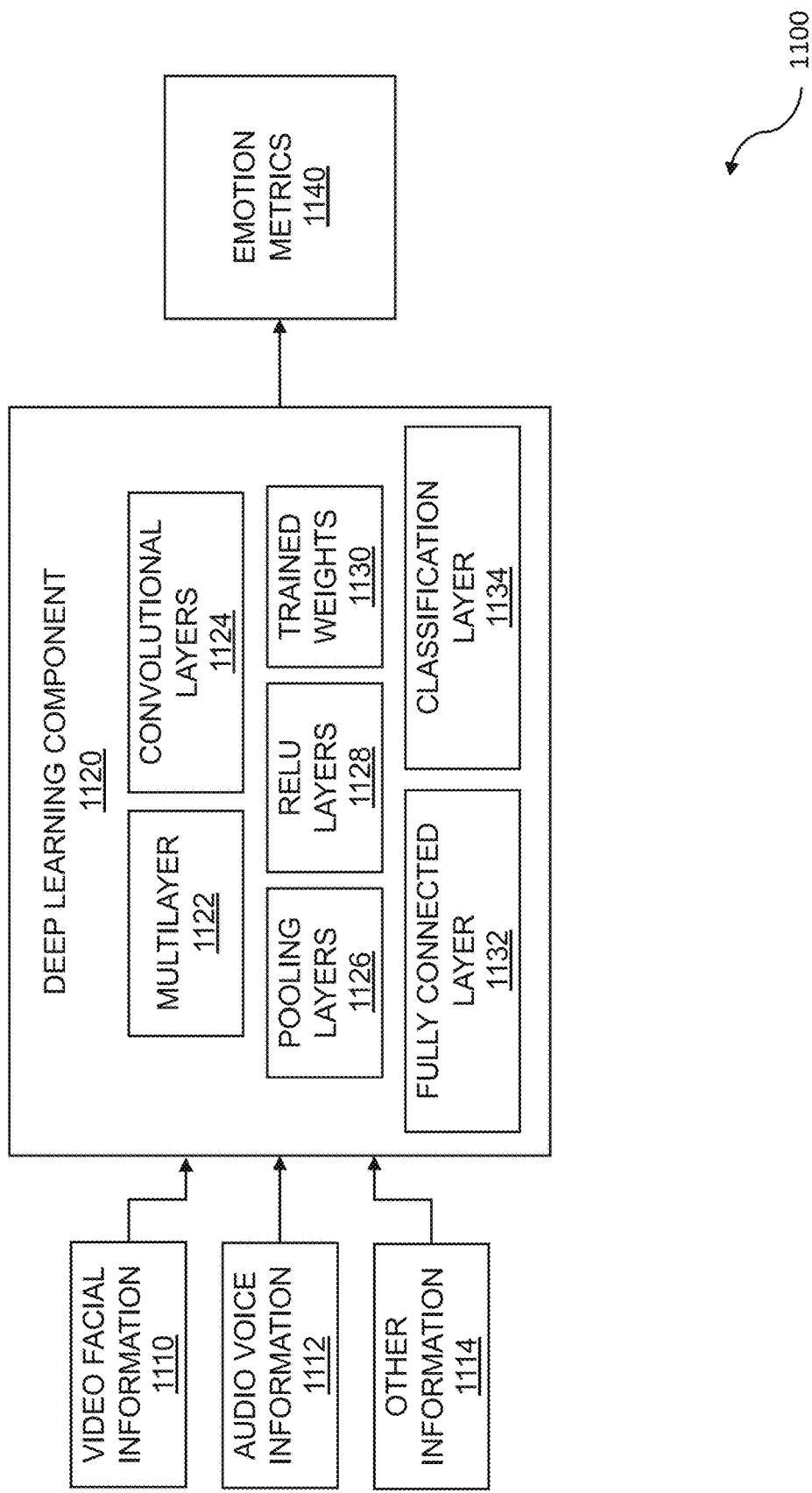
FIG. 11 illustrates a high-level diagram for deep learning.

FIG. 11 illustrates a high-level diagram for deep learning. Deep learning can be used for vehicular in-cabin facial tracking using machine learning. A plurality of information channels is captured into a computing device such as a smartphone, personal digital assistant (PDA), tablet, laptop computer, and so on. The plurality of information channels includes contemporaneous audio information and video information from an individual. Trained weights are learned on a multilayered convolutional computing system. The trained weights are learned using the audio information and the video information from the plurality of information channels. The trained weights cover both the audio information and the video information and are trained simultaneously. The learning facilitates emotion analysis of the audio information and the video information. Further information is captured into a second computing device. The second computing device and the first computing device may be the same computing device. The further information can include physiological information, contextual information, and so on. The further information is analyzed using the trained weights to provide an emotion metric based on the further information.

Understanding and evaluating moods, emotions, or mental states requires a nuanced evaluation of facial expressions, audio expressions, or other cues generated by people. Mental state analysis is important in many areas such as research, psychology, business, intelligence, law enforcement, and so on. The understanding of mental states can be used in a variety of fields, such as improving marketing analysis, assessing the effectiveness of customer service experiences and retail experiences, and evaluating the consumption of content such as movies and videos. Identifying points of frustration in a customer transaction can allow a company to take action to address the causes of the frustration. By streamlining processes, key performance areas such as customer satisfaction and customer transaction throughput can be improved, resulting in increased sales and revenues.

Deep learning is a branch of machine learning which seeks to imitate in software the activity which takes place in layers of neurons in the neocortex of the human brain. Deep learning applications include processing of image data, audio data, and so on. FIG. 11 illustrates a high-level diagram for deep learning 1100. The deep learning can be accomplished using a multilayered convolutional computing system, a convolutional neural network, or other techniques. The deep learning can accomplish image analysis, audio analysis, and other analysis tasks. A deep learning component 1120 collects and analyzes various types of information from a plurality of information channels. The information channels can include video facial information 1110, audio voice information 1112, other information 1114, and so on. In embodiments, the other information can include one or more of electrodermal activity, heart rate, heart rate variability, skin temperature, blood pressure, muscle movements, or respiration.

Returning to the deep learning component 1120, the deep learning component can include a multilayered convolutional computing system 1122. The multilayered convolutional computing system 1122 can include a plurality of layers of varying types. The layers can include one or more convolutional layers 1124 which can be used for learning and analysis. The convolutional layers can include pooling layers 1126 which can combine the outputs of clusters into a single datum. The layers can include one or more Rectified Linear Unit (ReLU) layers 1128. The one or more ReLU layers can implement an activation function such as f(x)–max(0,x), thus providing an activation with a threshold at zero. The convolutional layers can include trained weights 1130. The trained weights can be based on learning, where the learning uses information collected from one or more individuals via a plurality of information channels. The trained weights can be used to enable the multilayer convolutional computing system to determine image characteristics, voice characteristics, and so on.

The deep learning component 1120 can include a fully connected layer 1132. The fully connected layer 1132 processes each data point from the output of a collection of intermediate layers. The fully connected layer 1132 takes all data points in the previous layer and connects them to every single node contained within the fully connected layer. The output of the fully connected layer 1132 can provide input to a classification layer 1134. The classification layer can be used to classify emotional states, mental states, moods, and so on. The classification can be based on using classifiers. The deep learning component 1120 provides data that includes emotion metrics 1140. The emotion metrics can include an emotion type, a number of occurrences of the emotional type, the intensity of the emotional type, and so on. The emotion metric can be based on a threshold value, on a target value, on a goal, etc. The emotion metric can be based on emotion types that can occur over a period of time. More than one emotion metric can be provided. The emotion metric can represent a human perception metric.

Figure 12:
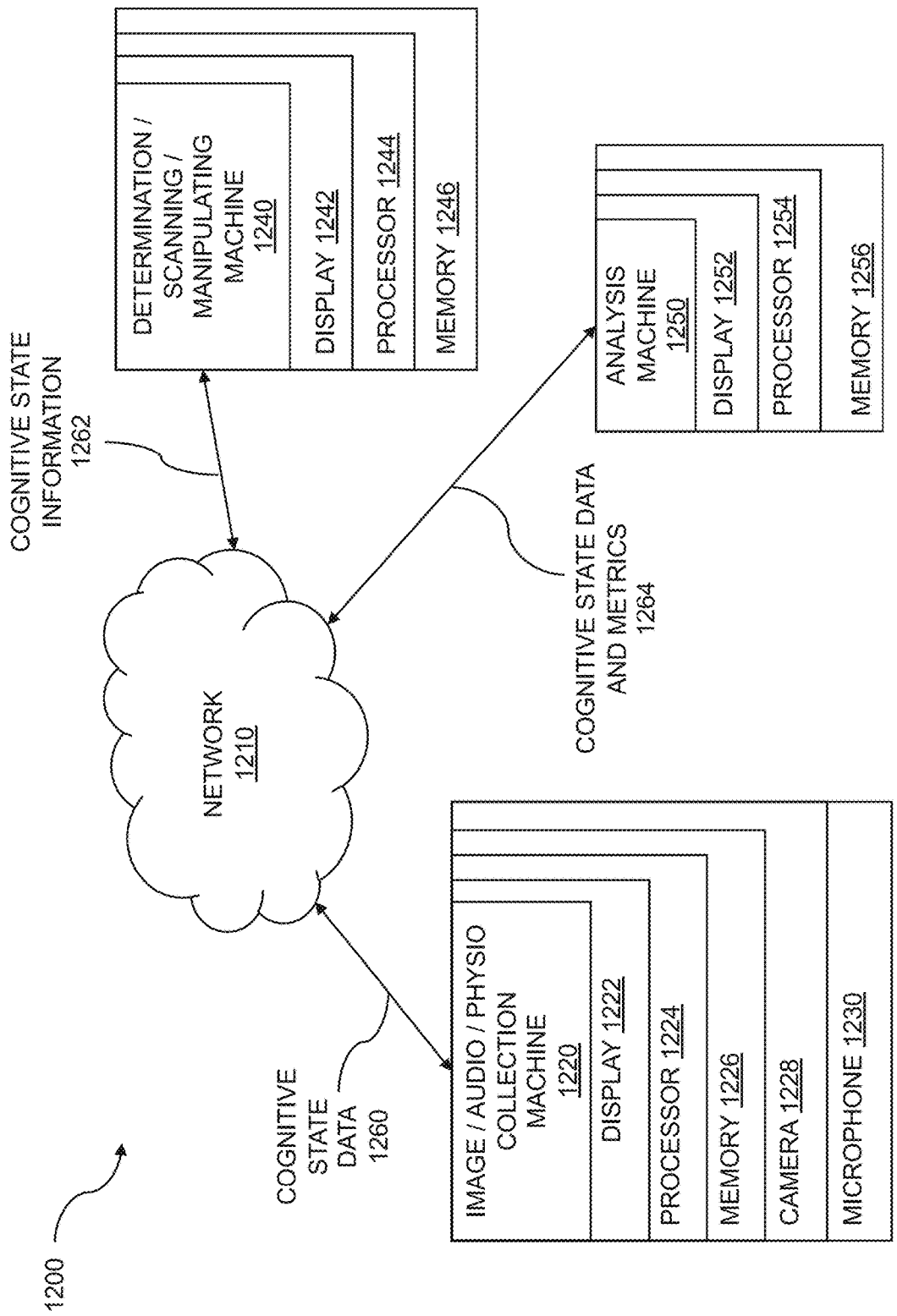
FIG. 12 is a diagram of a system for vehicular in-cabin facial tracking using machine learning.

FIG. 12 is a diagram of a system for vehicular in-cabin facial tracking using machine learning. In-cabin sensor data of a vehicle interior is collected. The in-cabin sensor data includes images of the vehicle interior. A set of seating locations for the vehicle interior is determined. The set is based on the images. The set of seating locations is scanned for performing facial detection for each of the seating locations using a facial detection model. A view of a detected face is manipulated. The manipulation is based on a geometry of the vehicle interior. Cognitive state data of the detected face is analyzed. The cognitive state data analysis is based on additional images of the detected face. The cognitive state data analysis uses the view that was manipulated. Audio information is obtained, and the determining is augmented based on the audio information. The audio information can include speech and non-speech vocalizations. The cognitive state data is promoted to a using application.

The system 1200 can include a network 1210 (Internet, intranet, or another computer network), which can be used for communication among various machines. An image, audio, or physio collection machine 1220 has a memory 1226 which stores instructions and one or more processors 1224 attached to the memory 1226, wherein the one or more processors 1224 can execute instructions. The image, audio, or physio collection machine 1220 can also have a network connection to carry cognitive state data 1260, and a display 1222 that can present human perception data, human perception profiles, mental state data, mental state profiles, cognitive state data, cognitive state profiles, emotional states, emotional state profiles, and so on. The image, audio, or physio collection machine 1220 can collect images of a vehicle interior. The images can include images of a vehicle interior, cognitive state data including image data, voice data, audio data, physiological data, etc., from an occupant of a vehicle. The images can include infrared images. In some embodiments, there are multiple image, audio, or physio collection machines 1220 that each collect images. This type of collection machine can have a camera 1228, a microphone 1230, or other sensors. In some embodiments, multiple cameras, microphones, or physiological sensors will be present. Other embodiments include obtaining audio information and augmenting the determining with the audio information. The audio data can include speech, non-speech vocalizations, etc. Further embodiments may include obtaining physiological information from the occupant of the vehicle and augmenting the determining of the human perception metric based on the physiological information. The physiological data can include heart rate, heart rate variability, respiration rate, skin conductivity, and so on. Once the cognitive state data 1260 has been collected, the image, audio, or physio collection machine 1220 can upload information to a determination, scanning, and/or manipulating machine 1240, based on the human perception data from the occupant of the vehicle. The image, audio, or physio collection machine 1220 can communicate with the determination, scanning, or manipulating machine 1240 over the network 1210, the Internet, some other computer network, or by another method suitable for communication between two machines. In some embodiments, the determination, scanning, and/or manipulating machine 1240 functionality is embodied in the image, audio, and physio collection machine 1220.

The determination, scanning, and/or manipulating machine 1240 can have a network connection for cognitive state information 1262, a memory 1246 which stores instructions, and one or more processors 1244 attached to the memory 1246, wherein the one or more processors 1244 can execute instructions. The determination, scanning, and/or manipulating machine 1240 can receive cognitive state data, collected from an occupant of the vehicle, from the image, audio, or physio collection machine 1220, and can determine a set of seating locations, scan the set of seating locations for performing facial detection, and manipulate a view of a detected face for the occupant. The determination, scanning, and/or manipulating machine 1240 can also compare further cognitive state data with a cognitive state profile while the occupant is in a second vehicle. In some embodiments, the determination, scanning, and/or manipulating machine 1240 also allows a user to view and evaluate the cognitive state information, or other data for the occupant of the vehicle, on a display 1242. The determination, scanning, and/or manipulating machine 1240 can then provide the cognitive state information 1262 to the analysis machine 1250. In some embodiments, the image, audio, or physio capture machine 1220 can also function as the analysis machine 1250. In further embodiments, the determination, scanning, and/or manipulating machine 1240 can also function as the analysis machine 1250.

The analysis machine 1250 can have a memory 1256 which stores instructions, and one or more processors 1254 attached to the memory 1256, wherein the one or more processors 1254 can execute instructions. The analysis machine can use a network 1210 such as a computer network, the Internet, or another computer communication method, to request cognitive state information 1262 from the determination, scanning, and/or manipulating machine 1240. The analysis machine 1250 can generate cognitive states, cognitive state information, and analyzed cognitive state data, along with cognitive state metric information 1264, based on cognitive state data 1260, from the occupant of the vehicle. The cognitive state information and the related metric(s) for the occupant can be presented on a display 1252. In some embodiments, the analysis machine 1250 is set up to receive cognitive state data 1260 that is collected from an occupant of the vehicle, in real-time or near real-time. In other embodiments, the analysis machine is set up to receive the cognitive state data on an intermittent basis. In at least one embodiment, a single computer incorporates the image, audio, or physio collection machine, the determination, scanning, and/or manipulating machine, and the analysis machine functionalities.

The system 1200 can comprise a computer system for facial analysis comprising: a memory which stores instructions; one or more processors coupled to the memory wherein the one or more processors, when executing the instructions which are stored, are configured to: collect in-cabin sensor data of a vehicle interior, wherein the in-cabin sensor data includes images of the vehicle interior; determine a set of seating locations for the vehicle interior, based on the images; scan the set of seating locations for performing facial detection for each of the seating locations using a facial detection model; manipulate a view of a detected face, based on a geometry of the vehicle interior; and analyze cognitive state data of the detected face, based on additional images of the detected face, using the view that was manipulated.

In embodiments the system 1200 comprises a computer program product embodied in a non-transitory computer readable medium for facial analysis, the computer program product comprising code which causes one or more processors to perform operations of: collecting in-cabin sensor data of a vehicle interior, wherein the in-cabin sensor data includes images of the vehicle interior; determining a set of seating locations for the vehicle interior, based on the images; scanning the set of seating locations for performing facial detection for each of the seating locations using a facial detection model; manipulating a view of a detected face, based on a geometry of the vehicle interior; and analyzing cognitive state data of the detected face, based on additional images of the detected face, using the view that was manipulated.

Each of the above methods may be executed on one or more processors on one or more computer systems. Embodiments may include various forms of distributed computing, client/server computing, and cloud-based computing. Further, it will be understood that for each flow chart in this disclosure, the depicted steps or boxes are provided for purposes of illustration and explanation only. The steps may be modified, omitted, or re-ordered and other steps may be added without departing from the scope of this disclosure. Further, each step may contain one or more sub-steps. While the foregoing drawings and description set forth functional aspects of the disclosed systems, no particular arrangement of software and/or hardware for implementing these functional aspects should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. Each element of the block diagrams and flowchart illustrations, as well as each respective combination of elements in the block diagrams and flowchart illustrations, illustrates a function, step, or group of steps of the methods, apparatus, systems, computer program products, and/or computer-implemented methods. Any and all such functions may be implemented by computer program instructions, by special-purpose hardware-based computer systems, by combinations of special purpose hardware and computer instructions, by combinations of general purpose hardware and computer instructions, and so on. Any and all of which may be generally referred to herein as a "circuit," "module," or "system."

A programmable apparatus which executes any of the above-mentioned computer program products or computer implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are not limited to applications involving conventional computer programs or programmable apparatus that run them. It is contemplated, for example, that embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized. The computer readable medium may be a non-transitory computer readable medium for storage. A computer readable storage medium may be electronic, magnetic, optical, electromagnetic, infrared, semiconductor, or any suitable combination of the foregoing. Further computer readable storage medium examples may include an electrical connection having one or more wires, a portable computer diskette, a hard disk, a random-access memory (RAM), a read-only memory (ROM), an erasable programmable read-only memory (EPROM, Flash, MRAM, FeRAM, or phase change memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. Each thread may spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the entity causing the step to be performed.

While the invention has been disclosed in connection with preferred embodiments shown and described in detail, various modifications and improvements thereon will become apparent to those skilled in the art. Accordingly, the spirit and scope of the present invention is not to be limited by the foregoing examples but is to be understood in the broadest sense allowable by law.

What is claimed is:

1. A computer-implemented method for facial analysis comprising:
    collecting in-cabin sensor data of a vehicle interior of a vehicle, wherein the in-cabin sensor data includes images of the vehicle interior;
    determining a set of seating locations for the vehicle interior, based on the images;
    scanning the set of seating locations for performing facial detection for each of the seating locations using a facial detection model;
    manipulating a view of a detected face of a first occupant, based on a geometry of the vehicle interior;
    analyzing cognitive state data of the detected face, based on additional images of the detected face, using the view that was manipulated;
    generating a human perception metric for the detected face, based on the cognitive state data;
    creating a classifier for a deep neural network based on the human perception metric;
    detecting a face of a second occupant;
    categorizing an interaction between the first occupant and the second occupant using the classifier; and
    inferring an aggression-based relationship between the first occupant and the second occupant based on the categorizing.

2. The method of claim 1 further comprising promoting the cognitive state data to a using application.

3. The method of claim 2 further comprising providing vehicle manipulation information to the vehicle from the using application.

4. The method of claim 3 wherein the using application uses network connectivity remote from the vehicle to provide the manipulation information.

5. The method of claim 4 wherein the manipulation information is for an autonomous or semi-autonomous vehicle.

6. The method of claim 1 wherein the human perception metric includes a distractedness, drowsiness, or impairment evaluation for an occupant.

7. The method of claim 6 wherein the human perception metric includes a mood for the occupant.

8. The method of claim 1 wherein the human perception metric includes a mood for the vehicle.

9. The method of claim 1 further comprising defining regions within the vehicle interior.

10. The method of claim 9 wherein the regions comprise a front-seat region and a back-seat region.

11. The method of claim 10 wherein the regions further comprise a third-row seat region.

12. The method of claim 9 further comprising tracking the detected face within a single region of the vehicle interior.

13. The method of claim 12 further comprising scaling the detected face based on a location of the single region.

14. The method of claim 1 wherein the performing facial detection is accomplished using a full-view facial detection model.

15. The method of claim 14 wherein the full-view facial detection model is processed remotely from the vehicle.

16. The method of claim 1 wherein the analyzing is performed using a landmark model.

17. The method of claim 16 wherein the landmark model is processed in an embedded processor.

18. The method of claim 1 wherein faces detected in a vehicle front seat are rotated toward a centerline of the vehicle.

19. The method of claim 1 wherein faces detected in a vehicle rear seat are stretched to a predetermined size.

20. The method of claim 1 wherein the facial detection and the analyzing cognitive state data are performed using machine learning.

21. The method of claim 20 wherein the machine learning is fragmented across a plurality of hardware platforms.

22. The method of claim 1 wherein the analyzing is performed using models provided through a software development kit (SDK).

23. The method of claim 1 further comprising sending the human perception metric to a second vehicle.

24. The method of claim 20 wherein the machine learning includes a RELU layer.

25. The method of claim 24 wherein the RELU layer comprises a leaky RELU layer.

26. The method of claim 24 wherein the RELU layer includes an activation function that includes a negative slope, thereby preventing a dying RELU condition.

27. The method of claim 1 wherein the human perception metric includes a recommendation application.

28. The method of claim 27 wherein the recommendation application includes recommendations for vehicle content.

29. The method of claim 27 wherein the recommendation application includes recommendations for taking a break from travelling.

30. A computer program product embodied in a non-transitory computer readable medium for facial analysis, the computer program product comprising code which causes one or more processors to perform operations of:
   collecting in-cabin sensor data of a vehicle interior of a vehicle, wherein the in-cabin sensor data includes images of the vehicle interior;
   determining a set of seating locations for the vehicle interior, based on the images;
   scanning the set of seating locations for performing facial detection for each of the seating locations using a facial detection model;
   manipulating a view of a detected face of a first occupant, based on a geometry of the vehicle interior;
   analyzing cognitive state data of the detected face, based on additional images of the detected face, using the view that was manipulated;
   generating a human perception metric for the detected face, based on the cognitive state data;
   creating a classifier for a deep neural network based on the human perception metric;
   detecting a face of a second occupant;
   categorizing an interaction between the first occupant and the second occupant using the classifier; and
   inferring an aggression-based relationship between the first occupant and the second occupant based on the categorizing.

31. A computer system for facial analysis comprising:
   a memory which stores instructions;
   one or more processors coupled to the memory wherein the one or more processors, when executing the instructions which are stored, are configured to:
      collect in-cabin sensor data of a vehicle interior of a vehicle, wherein the in-cabin sensor data includes images of the vehicle interior;
      determine a set of seating locations for the vehicle interior, based on the images;
      scan the set of seating locations for performing facial detection for each of the seating locations using a facial detection model;
      manipulate a view of a detected face of a first occupant, based on a geometry of the vehicle interior;
      analyze cognitive state data of the detected face, based on additional images of the detected face, using the view that was manipulated;
      generate a human perception metric for the detected face, based on the cognitive state data;
      create a classifier for a deep neural network based on the human perception metric;
      detect a face of a second occupant;
      categorize an interaction between the first occupant and the second occupant using the classifier; and
      infer an aggression-based relationship between the first occupant and the second occupant based on categorizing.

\* \* \* \* \*